US012774212B2

(12) United States Patent
Meli et al.

(10) Patent No.: US 12,774,212 B2
(45) Date of Patent: Oct. 27, 2026

(54) TALC PARTICULATE

(71) Applicant: IMERTECH SAS, Paris (FR)

(72) Inventors: Gilles Meli, Le Fauga (FR); Caroline Abler, Roquettes (FR); Daniel Tracas, Lias (FR); Théodore Ineich, Toulouse (FR); Alexandra Jakob, Toulouse (FR)

(73) Assignee: IMERTECH SAS, Paris (FR)

( * ) Notice: Subject to any disclaimer, the term of this patent is extended or adjusted under 35 U.S.C. 154(b) by 697 days.

(21) Appl. No.: 17/998,287

(22) PCT Filed: May 11, 2021

(86) PCT No.: PCT/EP2021/062524
§ 371 (c)(1),
(2) Date: Nov. 9, 2022

(87) PCT Pub. No.: WO2021/228885
PCT Pub. Date: Nov. 18, 2021

(65) Prior Publication Data

US 2023/0227320 A1 Jul. 20, 2023

(30) Foreign Application Priority Data

May 11, 2020 (EP) .................................... 20290040
May 12, 2020 (EP) .................................... 20305475

(51) Int. Cl.
*C01B 33/40* (2006.01)
*C08K 3/34* (2006.01)

(52) U.S. Cl.
CPC .............. *C01B 33/40* (2013.01); *C08K 3/346* (2013.01); *C01P 2004/32* (2013.01); *C01P 2004/51* (2013.01); *C01P 2004/61* (2013.01); *C01P 2006/12* (2013.01); *C01P 2006/19* (2013.01); *C08K 2201/003* (2013.01); *C08K 2201/006* (2013.01)

(58) Field of Classification Search
None
See application file for complete search history.

(56) References Cited

U.S. PATENT DOCUMENTS

| | | | | |
|---|---|---|---|---|
| 5,374,677 | A | 12/1994 | Nishio et al. | |
| 6,348,536 | B1 | 2/2002 | Fourty et al. | |
| 2009/0194214 | A1 | 8/2009 | Galimberti et al. | |
| 2011/0229670 | A1 | 9/2011 | Gahleitner et al. | |
| 2013/0203908 | A1 | 8/2013 | Kock et al. | |
| 2015/0240083 | A1 | 8/2015 | Martin et al. | |
| 2015/0376414 | A1 | 12/2015 | Jouffret et al. | |
| 2017/0283578 | A1 * | 10/2017 | Mas | C09C 1/28 |

FOREIGN PATENT DOCUMENTS

| | | | | |
|---|---|---|---|---|
| CN | 101679673 | A | 3/2010 | |
| CN | 102164757 | A | 8/2011 | |
| CN | 1014871253 | A | 8/2015 | |
| CN | 105121561 | A | 12/2015 | |
| CN | 106317963 | A | 1/2017 | |
| CN | 106795320 | A | 5/2017 | |
| CN | 107405267 | A | 11/2017 | |
| CN | 107849281 | A | 3/2018 | |
| CN | 108026307 | A | 5/2018 | |
| CN | 109071868 | A | 12/2018 | |
| CN | 110234690 | A | 9/2019 | |
| CN | 110392564 | A | 10/2019 | |
| CN | 110691812 | A | 1/2020 | |
| DE | 202014010800 | U1 | 2/2017 | |
| EP | 0 519 725 | A2 | 12/1992 | |
| EP | 2 747 091 | A1 | 6/2014 | |
| EP | 2 990 444 | A1 | 3/2016 | |
| WO | 2014057273 | A1 | 4/2014 | |
| WO | 2016007363 | A1 | 1/2016 | |
| WO | 2017081031 | A1 | 5/2017 | |
| WO | WO-2018150002 | A1 * | 8/2018 | A61K 8/0225 |
| WO | 2018185180 | A1 | 10/2018 | |

OTHER PUBLICATIONS

International Search Report and Written Opinion mailed Aug. 13, 2021, in International Application No. PCT/EP2021/062524.
International Search Report for corresponding Chinese Application No. 202180034240.1 dated Dec. 22, 2023 (7 pages, translation included).
Dumas et al, "Fast-Geomimicking using Chemistry in Supercritical Water," Angewandte Chemie International Edition 2016, 55, pp. 9868-9871.
Holland HJ et al. "An XRD Morphology Index for Talcs: The Effect of Particle Size and Morphology on the Specific Surface Area," Advances in X-ray analysis, vol. 42, 2000, pp. 421-428.

* cited by examiner

*Primary Examiner* — Katarzyna I Kolb
(74) *Attorney, Agent, or Firm* — Finnegan, Henderson, Farabow, Garrett & Dunner, LLP

(57) ABSTRACT

A talc particulate, a polymer composition comprising said talc particulate, methods of making said talc particulate and said polymer composition, and the various uses of said talc particulate.

18 Claims, 6 Drawing Sheets

(a)

(b)

(c)

TALC PARTICULATE

CLAIM FOR PRIORITY

This application is a U.S. national phase entry under 35 U.S.C. § 371 from PCT International Application No. PCT/EP2021/062524, filed May 11, 2021, which claims the benefit of priority of European Patent Application Nos. 20290040.3, filed May 11, 2020, and 20305475.4, filed May 12, 2022, from all of which this application claims priority and all of which are incorporated herein by reference.

TECHNICAL FIELD

The present invention relates generally to a new talc particulate, polymer compositions comprising said new talc particulate, and methods for making said talc particulate and polymer compositions. The present invention further relates to the various uses of said new talc particulate and polymer compositions, particularly the use of the new talc particulate to increase the flexural modulus and/or impact strength of a polymer composition.

BACKGROUND

Talc particulates have been developed as fillers for polymer compositions, particularly polypropylene based compositions. In particular, talc particulates have been developed to improve the physical properties of polymer compositions such as impact strength or flexural modulus.

In general, impact strength and flexural modulus are understood to be antagonistic properties in that increasing the impact strength of a polymer composition generally decreases its flexural modulus and vice versa.

It is therefore desirable to provide new talc particulates that may, for example, improve one or more physical properties of a polymer composition, for example one or both of flexural modulus and impact resistance.

SUMMARY

In accordance with a first aspect of the present invention there is provided a talc particulate having one or more of the following properties:

(a) a coherent scattering domain (CSD c*) equal to or less than about 1150 Angstroms;

(b) equal to or less than about 120 tetrahedral-octahedral-tetrahedral (TOT) layers;

(c) a delamination index according to TOT layers (DI (TOT)) equal to or greater than about 103;

(d) a shape factor equal to or greater than about 70;

(e) a $d_{95laser}$ equal to or less than about 25.0 μm;

(f) a $d_{95sedi}$ equal to or less than about 10.0 μm;

(g) a lamellarity index equal to or greater than about 2.5;

(h) a BET surface area equal to or greater than about 15 $m^2/g$;

(i) an oil absorption equal to or greater than about 65 mL/100 g;

(j) a contact angle equal to or less than about 43°.

Any one or more of properties (a) to (j) of the first aspect can be combined. For example, the talc particulate may have one, two, three, four, five, six, seven, eight, nine, or ten of properties (a) to (j).

In accordance with a second aspect of the present invention, which is also an embodiment of the first aspect of the present invention, there is provided a talc particulate having a delamination index according to tetrahedral-octahedral-tetrahedral (TOT) layers (DI(TOT)) equal to or greater than about 103.

In accordance with a third aspect of the present invention, which is also an embodiment of the first aspect of the present invention, there is provided a talc particulate having an oil absorption equal to or greater than about 65 mL/100 g and a lamellarity index equal to or greater than about 2.5.

In accordance with a fourth aspect of the present invention, which is also an embodiment of the first aspect of the present invention, there is provided a talc particulate having a contact angle equal to or less than about 43° and one or more of the following: (a) a $d_{95sedi}$ equal to or less than about 6.5 μm;

(b) a $d_{95laser}$ equal to or less than about 23.0 μm;

(c) a delamination index according to TOT layers (DI (TOT)) equal to or greater than about 103;

(d) an oil absorption equal to or greater than about 65 mL/100 g.

In accordance with a fifth aspect of the present invention, which is also an embodiment of the first aspect of the present invention, there is provided a talc particulate having:

(A) a lamellarity index equal to or greater than about 2.5;

(B) one or both of:

(a) a $d_{95sedi}$ equal to or greater than about 1.0 and equal to or less than about 5.0 μm; and (b) a $d_{95laser}$ equal to or greater than about 7.0 μm and equal to or less than about 20.0 μm; and (C) one or more of:

(a) a BET surface area equal to or greater than about 20 $m^2/g$ and equal to or less than about 30 $m^2/g$;

(b) a $d_{50sedi}$ equal to or greater than about 0.5 μm and equal to or less than about 2.5 μm; and (c) a $d_{50laser}$ equal to or greater than about 2.0 μm, and equal to or less than about 8.0 μm.

In accordance with a sixth aspect of the present invention there is provided a polymer composition comprising a talc particulate of any of the first, second, third, fourth, or fifth aspects of the present invention.

In accordance with a seventh aspect of the present invention there is provided a method for making a talc particulate, the method comprising classifying a feed talc material to remove a portion of the largest particles in the feed talc material, wherein the feed talc material has one or more of the following:

(a) a lamellarity index equal to or greater than about 2.5;

(b) a $d_{95sedi}$ equal to or less than about 15.0 μm;

(c) a $d_{95laser}$ equal to or less than about 40.0 μm;

(d) a $d_{50sedi}$ equal to or less than about 5.0 μm;

(e) a shape factor equal to or greater than about 40;

(f) a BET surface area equal to or greater than about 10 $m^2/g$.

The method of the seventh aspect of the present invention may, for example, make a talc particulate in accordance with any of the first, second, third, fourth, or fifth aspects of the present invention.

In accordance with an eighth aspect of the present invention there is provided a talc particulate obtained by and/or obtainable by the method of the seventh aspect of the present invention.

In accordance with a ninth aspect of the present invention there is provided a method for making a polymer composition, the method comprising combining a polymer or polymer precursors with the talc particulate of the first, second, third, fourth, or fifth aspect of the present invention.

The method of the ninth aspect of the present invention may, for example, make a polymer composition in accordance with the sixth aspect of the present invention.

In accordance with a tenth aspect of the present invention there is provided a polymer composition obtained by and/or obtainable by the method of the ninth aspect of the present invention.

In accordance with an eleventh aspect of the present invention there is provided a use of a talc particulate of the first, second, third, fourth, or fifth aspect of the present invention to increase the flexural modulus of a polymer composition into which it is incorporated.

The polymer composition may, for example, be a polymer composition in accordance with the sixth aspect of the present invention.

In accordance with a twelfth aspect of the present invention there is provided a use of a talc particulate of the first, second, third, fourth, or fifth aspect of the present invention to increase the impact strength of a polymer composition into which it is incorporated. The polymer composition may, for example, be a polymer composition in accordance with the sixth aspect of the present invention.

Certain embodiments of any aspect of the present invention may provide one or more of the following advantages:

- polymer composition with increased impact strength;
- polymer composition with increased flexural modulus;
- talc particulate with increased delamination (e.g. demonstrated by number of TOT layers in a single crystallite) whilst maintaining the plate-like shape of the particles (e.g. demonstrated by lamellarity index and/or shape factor);
- talc particulate with decreased topcut (i.e. $d_{95}$);
- talc particulate with a relatively high BET surface area;
- talc particulate with an increased oil absorption;
- talc particulate with a decreased contact angle;
- talc particulate with decreased decomposition temperature;
- talc particulate with increased cation exchange capacity.

The details, examples and preferences provided in relation to any particular one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

FIGURES

Embodiments will now be described by way of example only, with reference to the Figures, in which:

FIG. 3 (*b*) is a plot of talc decomposition temperature as a function of $d_{95}$ topcut for inventive talc particulates;

DETAILED DESCRIPTION

Figure 1:
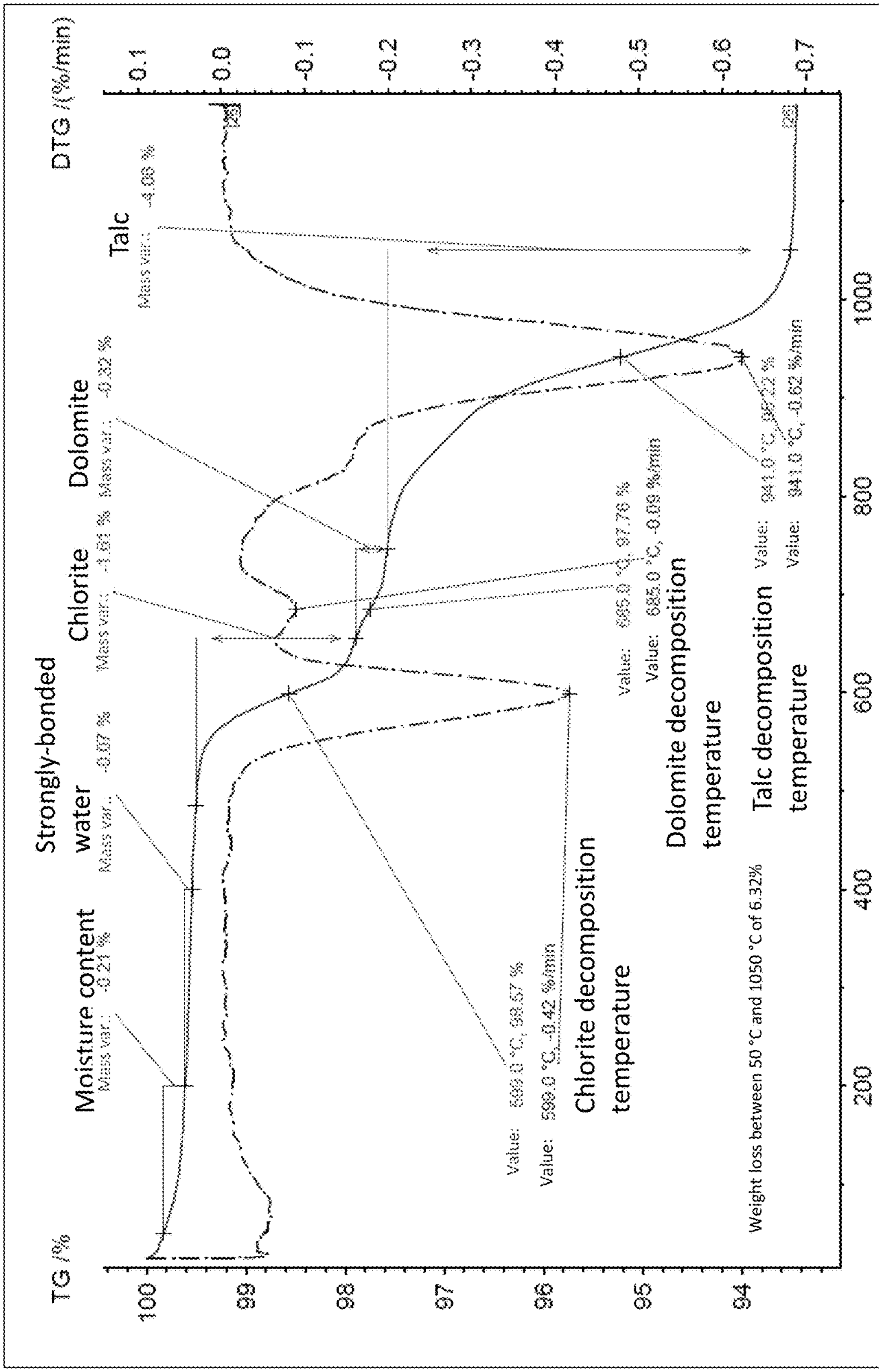
FIG. 1 is an example plot obtained by thermogravimetic analysis (TGA) and derivative thermogravimetry (DTG) of a talc particulate indicating regions in which release of moisture and strongly bonded water, and decomposition of chlorite, dolomite and talc, are visible.

The present invention is based on the surprising and advantageous finding that a new talc particulate can increase both the impact strength and the flexural modulus of polymer compositions, particularly polypropylene compositions, into which it is incorporated. The new talc particulate is obtained by removing a portion of the largest particles of a high aspect ratio feed talc material (reflected, for example, by a high lamellarity index and/or a high shape factor). Thus, the new talc particulate is a high aspect ratio talc having a relatively low topcut (i.e. $d_{95}$). It has surprisingly been found that this new talc particulate has a number of properties that are different to those of the feed talc material and other known talc particulates. The new talc particulate can therefore be defined in a number of ways.

Talc Particulate

As used herein, the term “talc” means either the magnesium silicate mineral, or the mineral chlorite (magnesium aluminium silicate), or a mixture of the two, optionally associated with other minerals, for example, dolomite and/or magnesite, or furthermore, synthetic talc, also known as talcose.

In certain embodiments, the talc is the magnesium silicate mineral or the mineral chlorite, or a mixture thereof. Optionally, the talc may further include dolomite or magnesite, or combinations thereof. The total amount of other minerals such as dolomite and/or magnesite in the talc may be less than about 35% by weight, based on the total weight of talc, for example, less than about 30% by weight, or less than about 25% by weight, or less than about 20% by weight, or less than about 15% by weight, or less than about 10% by weight, or less than about 5% by weight, or less than about 1% by weight, or less than about 0.75% by weight, or 0.5% by weight or less, based on the total weight of talc. In certain embodiments, the talc comprises, consists essentially of, or consists of magnesium silicate mineral. In certain embodiments, the talc is a mixture of magnesium silicate mineral and/or chlorite. The chlorite may, for example, comprise, consist essentially of, or consist of clinochlore ($(Mg,Fe^{2+})_5Al(Si_3Al)O_{10}(OH)_8$). For example, the chlorite may comprise primarily clinochlore. The weight ratio of magnesium silicate mineral to chlorite may be from about 5:1 to about 1:4, for example, from about 4:1 to about 1:1, or from about 4:1 to about 2:1, or from about 4:1 to about 2.5:1, or from about 4:1 to about 3:1, or about 2:1, or about 3:1, or about 4:1. In certain embodiments, the talc comprises, consists essentially of, or consists of synthetic talc or talcose.

In certain embodiments, the talc is a hydroxylated magnesium silicate, which belongs to the family of layered phyllosilicates. Its elemental structure consists of $MgO_4(OH)$ octahedral layers (named “0”) sandwiched between 6 ring silica tetrahedron $SiO_2$ (named “T”). This forms a repeating base unit made of TOT layers. These TOT layers will then pile up along c* axis to form a crystallite with a coherent crystalline structure whose size can be measured The talc particulate may, for example, be macrocrystalline talc (i.e. not microcrystalline talc).

The crystalline structure of talc (e.g., microcrystalline or macrocrystalline) may be generally described in relation to a “morphology index” (“M” or “MI”), as described in H. J. Holland and M. J. Murtagh, “An XRD Morphology Index for Tales: The Effect of Particle Size and Morphology on the Specific Surface Area," Advances in X-ray Analysis, Vol. 42, pp. 421-428 (2000) and WO 2016/007363 A1, the contents of which are incorporated herein by reference. For example, talcs having a relatively high MI may be considered "platy" or "lamellar" talcs and generally may have a macrocrystalline structure, whereas talcs having a relatively lower MI are less platy and may have a microcrystalline structure. As used herein, the term "platy" refers to a talc composition having an MI greater than or equal to about 0.6. According to some embodiments, the morphology index of the talc may be greater than or equal to 0.7, greater than or equal to 0.75, greater than or equal to 0.8, greater than or equal to 0.85, or greater than or equal to 0.9.

There is provided herein a talc particulate having one or more of the following properties:

(a) a coherent scattering domain (CSD c*) equal to or less than about 1150 Angstroms;
(b) equal to or less than about 120 tetrahedral-octahedral-tetrahedral (TOT) layers;
(c) a delamination index according to TOT layers (DI (TOT)) equal to or greater than about 103;
(d) a shape factor equal to or greater than about 70;
(e) a $d_{95laser}$ equal to or less than about 25.0 μm;
(f) a $d_{95sedi}$ equal to or less than about 10.0 μm;
(g) a lamellarity index equal to or greater than about 2.5;
(h) a BET surface area equal to or greater than about 15 $m^2/g$;
(i) an oil absorption equal to or greater than about 65 mL/100 g;
(j) a contact angle equal to or less than about 43°.

The talc particulate may have any one or more of properties (a) to (j). For example, the talc particulate may have two or more, three or more, four or more, five or more, six or more, seven or more, eight or more, or nine or more of properties (a) to (j). For example, the talc particulate may have all of (i.e. ten) properties (a) to (j).

The talc particulate may, for example, have any combination of the properties (a) to (j).

Properties (a) to (j) may broadly be divided into properties relating to particle shape (i.e. CSD c*, number of TOT layers, shape factor, lamellarity index and DI(TOT)), properties relating to particle size (i.e. $d_{95laser}$ and $d_{95sedi}$), a properties relating to the particle surface (i.e. BET surface area, oil absorption, and contact angle).

The talc particulate may, for example, have one or more of properties (a) to (j) relating to particle shape and one or more of properties (a) to (j) relating to particle size. The talc particulate may, for example, have one or more of properties (a) to (j) relating to particle shape and one or more of properties (a) to (j) relating to particle surface. The talc particulate may, for example, have one or more of properties (a) to (j) relating to particle size and one or more of properties (a) to (j) relating to particle surface. The talc particulate may, for example, have one or more of properties (a) to (j) relating to particle shape, one or more of properties (a) to (j) relating to particle size, and one or more of properties (a) to (j) relating to particle surface.

For example, the talc particulate may have a delamination index according to TOT layers (DI(TOT)) equal to or greater than about 103.

For example, the talc particulate may have an oil absorption equal to or greater than about 65 mL/100 g and a lamellarity index equal to or greater than about 2.5.

For example, the talc particulate may have a contact angle equal to or less than about 43° and one or more of the following:

a $d_{95sedi}$ equal to or less than about 6.5 μm;
a $d_{95laser}$ equal to or less than about 23.0 μm;
a delamination index according to TOT layers (DI(TOT)) equal to or greater than about 103; and
an oil absorption equal to or greater than about 65 mL/100 g.

For example, the talc particulate may have:

(A) a lamellarity index equal to or greater than about 2.5;
(B) one or both of:
  a $d_{95sedi}$ equal to or greater than about 1.0 and equal to or less than about 5.0 μm; and
  a $d_{95laser}$ equal to or greater than about 7.0 μm and equal to or less than about 20.0 μm; and
(C) one or more of:
  a BET surface area equal to or greater than about 20 $m^2/g$ and equal to or less than about 30 $m^2/g$;
  a $d_{50sedi}$ equal to or greater than about 0.5 μm and equal to or less than about 2.5 μm; and
a $d_{50laser}$ equal to or greater than about 2.0 μm, and equal to or less than about 8.0 μm.

For example, the talc particulate may have a lamellarity index equal to or greater than about 2.8 and a CSD c* equal to or less than about 1150 Angstroms. For example, the talc particulate may have a lamellarity index equal to or greater than about 2.8 and a CSD c* equal to or less than about 1050 Angstroms. For example, the talc particulate may have a lamellarity index equal to or greater than about 2.8 and a CSD c* ranging from about 800 Angstroms to about 1050 Angstroms.

For example, the talc particulate may have a lamellarity index equal to or greater than about 2.8 and equal to or less than about 120 TOT layers. For example, the talc particulate may have a lamellarity index equal to or greater than about 2.8 and equal to or less than about 110 TOT layers. For example, the talc particulate may have a lamellarity index equal to or greater than about 2.8 and from about 85 to about 110 TOT layers.

For example, the talc particulate may have a lamellarity index equal to or greater than about 2.8 and a DI(TOT) equal to or greater than about 103. For example, the talc particulate may have a lamellarity index equal to or greater than about 2.8 and a DI(TOT) equal to or greater than about 110.

For example, the talc particulate may have a lamellarity index equal to or greater than about 2.8 and a shape factor equal to or greater than about 70. For example, the talc particulate may have a lamellarity index equal to or greater than about 2.8 and a shape factor equal to or greater than about 120. For example, the talc particulate may have a lamellarity index equal to or greater than about 2.8 and a shape factor equal to or greater than about 123. For example, the talc particulate may have a lamellarity index equal to or greater than about 2.8 and a shape factor equal to or greater than about 125.

For example, the talc particulate may have a lamellarity index equal to or greater than about 2.8 and a $d_{95laser}$ equal to or less than about 25.0 μm.

For example, the talc particulate may have a lamellarity index equal to or greater than about 2.8 and a $d_{95sedi}$ equal to or less than about 10.0 μm.

For example, the talc particulate may have a lamellarity index equal to or greater than about 2.8 and a $d_{50laser}$ equal to or less than about 12.0 μm.

For example, the talc particulate may have a lamellarity index equal to or greater than about 2.8 and a $d_{50sedi}$ equal to or less than about 5.0 μm.

For example, the talc particulate may have a lamellarity index equal to or greater than about 2.8 and a BET surface area equal to or greater than about 15 $m^2/g$.

For example, the talc particulate may have a lamellarity index equal to or greater than about 2.8 and an oil absorption equal to or greater than about 65 mL/100 g.

For example, the talc particulate may have a lamellarity index equal to or greater than about 2.8 and a contact angle equal to or less than about 43°.

The properties of the talc particulate are further described below.

Particle Shape Properties

The CSD c* and number of TOT layers relate generally to the number of layers in the talc particles. The shape factor and lamellarity index relate generally to the overall shape of the talc particles. The DI(TOT) defines the relationship between the number of layers in the talc particles and the overall shape of the talc particles.

The coherent scattering domain (CSD) and number of TOT layers of the talc particulate may be determined by X-Ray Diffraction (XRD) and applying the Scherrer equation on the (002) and (006) peaks of the pattern.

For example, XRD patterns may be acquired using a PAnalytical X'PRO X-Ray diffractometer using a CuKα radiation of a wavelength of λ=1.5406 Å. The samples are obtained by filling an aluminium holder in order to obtain a quasi-random orientation. An example of acquisition parameters can be in the 2θ range=8-80° with a step size of 0.01° and a step duration of 2 s. The Scherrer equation is then applied on the (002) and (006) peaks of the talc pattern which are located at approximately 2θ=9.3-9.7° and 2θ=28.3-28.9° on the XRD pattern. This formula uses the width of the peak at half height relative to the background line in order to calculate the coherent scattering domain of the talc crystallite according the c* axis. Then, the number of TOT layers in a single talc crystallite can be deduced. This method is implemented in a paper on synthetic talc (Dumas et al., Angewandte Chemie International Edition 2016, 55, 9868-9871), the contents of which are incorporated herein by reference.

The Scherrer equation is expressed as follows:

$$L = \frac{\lambda \times 0.91}{FWHM \times \cos\theta}$$

L is the coherent scattering domain (CSD c*) (A).

λ is the wavelength of the X-Ray beam (A).

FWHM is the full width at half maximum of the considered diffraction peak (rad)

θ is the position of the diffraction peak (rad)

From this coherent scattering domain, it is possible to deduce the number of TOT layers (N(TOT)) that are stacked in the coherent scattering domain:

$$N(TOT) = \frac{L}{d}$$

L is the coherent scattering domain along c* axis (A)

d is the height of a talc elementary unit, i.e. the d(002) spacing d is calculated using the position of the (002) peak on the XRD pattern and the Bragg formula.

$$d = \frac{n\lambda}{2\sin\theta}$$

n is the diffraction order

λ is the wavelength of the X-Ray beam (A)

θ is the position of the diffraction peak (rad)

The talc particulate may, for example have a CSD c* equal to or less than about 1150 Angstroms. For example, the talc particulate may have a CSD c* equal to or less than about 1100 Angstroms or equal to or less than about 1050 Angstroms or equal to or less than about 1000 Angstroms or equal to or less than about 950 Angstroms.

The talc particulate may, for example, have a CSD c* equal to or greater than about 750 Angstroms. For example, the talc particulate may have a CSD c* equal to or greater than about 800 Angstroms or equal to or greater than about 850 Angstroms or equal to or greater than about 900 Angstroms.

For example, the talc particulate may have a CSD c* ranging from about 750 Angstroms to about 1150 Angstroms or from about 850 Angstroms to about 1050 Angstroms or from about 900 Angstroms to about 1000 Angstroms.

The talc particulate may, for example, have equal to or less than about 120 TOT layers. For example, the talc particulate may have equal to or less than about 115 TOT layers or equal to or less than about 110 TOT layers or equal to or less than about 105 TOT layers or equal to or less than about 100 TOT layers.

The talc particulate may, for example, have equal to or greater than about 50 TOT layers. For example, the talc particulate may have equal to or greater than about 55 TOT layers or equal to or greater than about 60 TOT layers or equal to or greater than about 65 TOT layers or equal to or greater than about 70 TOT layers or equal to or greater than about 75 TOT layers or equal to or greater than about 80 TOT layers or equal to or greater than about 85 TOT layers or equal to or greater than about 90 TOT layers or equal to or greater than about 95 TOT layers.

For example, the talc particulate may have from about 50 to about 120 TOT layers or from about 60 to about 120 TOT layers or from about 70 to about 120 TOT layers or from about 80 to about 115 TOT layers or from about 85 to about 110 TOT layers or from about 80 to about 105 TOT layers or from about 85 to about 105 TOT layers or from about 85 to about 100 TOT layers or from about 90 to about 100 TOT layers or from about 95 to about 100 TOT layers.

Shape factor refers to the property measured by the PANACEA (Particle Assessment by Natural Alignment and Conductivity Effect Analysis) method. This is equipment that enables the shape factor of a mineral to be measured. The equipment described in U.S. Patent 5,576,617, the contents of which are incorporated herein by reference, can be used. During the measurement, a talc particulate suspension is circulated by a pump through a cell where the conductivity is measured from one extremity to the other. When the pump is turned on, the non-spherical particles will naturally align along the axis of the pipe. In this position, the particles will present a minimal resistance to the flow of the electrical charges. The conductivity measurement is then maximal. When the pump is off, the particles will randomly orient according to Brownian movement. In this position, the electrical charges have to go through a longer path to progress in the suspension. The conductivity value then decreases. The number that is given by the tests results from the ratio between these 2 measurements (highest value over lowest value). Hence, a more lamellar product will lead to a higher ratio (higher shape factor) between these 2 measurements compared to a product showing a low lamellarity (lower shape factor).

For the shape factor measurement itself, a suspension volume corresponding to 50 g of dry product is taken. In order to avoid sedimentation when the pump is off, 10 mL of a dispersant, e.g. sodium polyacrylate, and 80 mL deionised water is added before homogenising the suspension. Then, the suspension is passed through a 53 μm BSS sieve in order to eliminate the coarse particles that may hinder the measurement.

Deionized water (around 200 mL) is added in order to obtain a density between 1.08 and 1.12 (i.e. a weight concentration between 12 and 17 wt. %, for example approximately 15 wt %). The pH of the suspension is then measured to check it is within 8.5 and 10 and if it is not the case, sodium hydroxide is added. The suspension is then left to stand for at least 20 minutes. The PANACEA method is then performed after vigorously shaking to re-suspend the sample. The shape factor is obtained from an average of at least 3 measurements.

The talc particulate may, for example, have a shape factor equal to or greater than about 70. For example, the talc particulate may have a shape factor equal to or greater than about 75 or equal to or greater than about 80 or equal to or greater than about 85 or equal to or greater than about 90 or equal to or greater than about 95 or equal to or greater than about 100 or equal to or greater than about 105 or equal to or greater than about 110 or equal to or greater than about 115 or equal to or greater than about 120.

The talc particulate may, for example, have a shape factor equal to or less than about 200. For example, the talc particulate may have a shape factor equal to or less than about 195 or equal to or less than about 190 or equal to or less than about 185 or equal to or less than about 180 or equal to or less than about 175 or equal to or less than about 170 or equal to or less than about 165 or equal to or less than about 160 or equal to or less than about 155 or equal to or less than about 150 or equal to or less than about 145 or equal to or less than about 140 or equal to or less than about 135 or equal to or less than about 130.

For example, the talc particulate may have a shape factor ranging from about 70 to about 200 or from about 80 to about 200 or from about 90 to about 200 or from about 100 to about 200 or from about 100 to about 180 or from about 100 to about 160 or from about 100 to about 150 or from about 110 to about 140 or from about 120 to about 130.

Lamellarity index (L.I.) is defined by the following ratio:

$$\frac{d50\text{laser} - d50sedi}{d50sedi}$$

in which "$d_{50laser}$" is the value of the mean particle size ($d_{50}$) measured by laser diffraction (standard NFX-11-666 or ISO 13320-1) and "$d_{50sedi}$" is the value of the median diameter obtained by sedimentation using a sedigraph (standard Afnor-X-11-683 ISO 13317-3), as described below and in the Examples. Reference may be made to the article by G. Baudet and J. P. Rona, Ind. Min. Mines et Carr. Les techn. June, July 1990, pp 55-61, which shows that this index is correlated to the mean ratio of the largest dimension of the particle to its smallest dimension.

In the sedimentation technique referred to above, particle size properties referred to herein for the talc particulate materials are as measured in a well-known manner by sedimentation of the particulate material in a fully dispersed condition in an aqueous medium using a Sedigraph 5100 machine as supplied by Micromeritics Instruments Corporation, Norcross, Ga., USA (www.micromeritics.com), referred to herein as a "Micromeritics Sedigraph 5100 unit", and based on application of Stokes' Law. Such a machine provides measurements and a plot of the cumulative percentage by weight of particles having a size, referred to in the art as the "equivalent spherical diameter" (e.s.d), less than given e.s.d values. The mean particle size $d_{50sedi}$ is the value determined in this way of the particle e.s.d at which there are 50% by weight of the particles which have an equivalent spherical diameter less than that $d_{50}$ value. The $d_{95sedi}$ value is the value at which 95% by weight of the particles have an esd less than that $d_{95sedi}$ value. Particle size properties may be determined in accordance with ISO 13317-3, or any method equivalent thereto.

In the laser diffraction technique referred to above, particle size properties referred to herein for the particulate talc materials are measured by wet Malvern laser scattering (standard ISO 13320-1). In this technique, the size of particles in powders, suspensions and emulsions may be measured using the diffraction of a laser beam, based on the application of Mie theory. Such a machine, for example a Malvern Mastersizer S (as supplied by Malvern instruments) provides measurements and a plot of the cumulative percentage by volume of particles having a size, referred to in the art as the "equivalent spherical diameter" (e.s.d), less than given e.s.d values. The mean particle size $d_{50}$ is the value determined in this way of the particle e.s.d. at which there are 50% by weight of the particles which have an equivalent spherical diameter less than that $d_{50}$ value. For the avoidance of doubt, the measurement of particle size using laser light scattering is not an equivalent method to the sedimentation method referred to above.

Details of the sedigraphic and laser particle size measurement methods used in the preparation of the present application are set out in the Examples.

In general, talc materials having a lamellarity index equal to or greater than about 2.8 may be referred to as "High Aspect Ratio" (HAR) talcs.

The talc particulate may, for example, have a lamellarity index equal to or greater than about 2.5. For example, the talc particulate may have a lamellarity index equal to or greater than about 2.6 or equal to or greater than about 2.7 or equal to or greater than about 2.8 or equal to or greater than about 2.9. In particular, the talc particulate may have a lamellarity index equal to or greater than about 2.8 or equal to or greater than about 2.9.

The talc particulate may, for example, have a lamellarity index equal to or less than about 6.0. For example, the talc particulate may have a lamellarity index equal to or less than about 5.5 or equal to or less than about 5.0 or equal to or less than about 4.5 or equal to or less than about 4.0 or equal to or less than about 3.5.

For example, the talc particulate may have a lamellarity index ranging from about 2.8 to about 6.0 or from about 2.8 to about 5.0 or from about 2.8 to about 4.0 or from about 2.8 to about 3.5.

Delamination index according to TOT layers (DI(TOT)) is defined by the following equation:

$$DI(TOT) = \frac{\text{Shape Factor (PANACEA)}}{N(TOT)} \times 100$$

The talc particulate may, for example, have a DI(TOT) equal to or greater than about 103. For example, the talc particulate may have a DI(TOT) equal to or greater than about 105 or equal to or greater than about 110 or equal to or greater than about 115 or equal to or greater than about 120 or equal to or greater than about 125.

The talc particulate may, for example, have a DI(TOT) equal to or less than about 200. For example, the talc particulate may have a DI(TOT) equal to or less than about 195 or equal to or less than about 190 or equal to or less than about 185 or equal to or less than about 180 or equal to or less than about 175 or equal to or less than about 170 or equal to or less than about 165 or equal to or less than about 160 or equal to or less than about 155 or equal to or less than about 150 or equal to or less than about 145 or equal to or less than about 140.

The talc particulate may, for example, have a DI(TOT) ranging from about 103 to about 200 or from about 110 to about 200 or from about 120 to about 200 or from about 110 to about 190 or from about 120 to about 180 or from about 120 to about 170 or from about 120 to about 160 or from about 120 to about 150 or from about 120 to about 140.

Particle Size Properties

The "sedi" particle sizes referred to below relate to particle sizes measured by the sedimentation method described above in relation to lamellarity index. The "laser" particle sizes referred to below relate to particle sizes measured by the laser diffraction method described above in relation to lamellarity index.

The talc particulate may, for example, have a $d_{95laser}$ equal to or less than about 25.0 μm. For example, the talc particulate may have a $d_{95laser}$ equal to or less than about 24.0 μm or equal to or less than about 23.0 μm or equal to or less than about 22.0 μm or equal to or less than about 21.0 μm or equal to or less than about 20.0 μm or equal to or less than about 19.0 μm or equal to or less than about 18.0 μm or equal to or less than about 17.0 μm or equal to or less than about 16.0 μm or equal to or less than about 15.0 μm.

The talc particulate may, for example, have a $d_{95laser}$ equal to or greater than about 7.0 μm. for example, the talc particulate may have a $d_{95laser}$ equal to or greater than about 8.0 μm or equal to or greater than about 9.0 μm or equal to or greater than about 10.0 μm or equal to or greater than about 11.0 μm or equal to or greater than about 12.0 μm.

The talc particulate may, for example, have a $d_{95laser}$ ranging from about 7.0 μm to about 25.0 μm or from about 7.0 μm to about 20.0 μm or from about 10.0 μm to about 20.0 μm or from about 12.0 μm to about 16.0 μm.

In particular embodiments such as in the fourth aspect of the present invention, the talc particulate has a $d_{95laser}$ equal to or less than about 23.0 μm. For example, the talc particulate may have a $d_{95laser}$ equal to or less than about 22.0 μm or equal to or less than about 21.0 μm or equal to or less than about 20.0 μm or equal to or less than about 19.0 μm or equal to or less than about 18.0 μm. For example, the talc particulate may have a $d_{95laser}$ equal to or greater than about 7.0 μm or equal to or greater than about 10.0 μm or equal to or greater than about 12.0 μm. For example, the talc particulate may have a $d_{95laser}$ ranging from about 7.0 μm to about 23.0 μm or from about 10.0 μm to about 23.0 μm or from about 12.0 μm to about 23.0 μm or from about 7.0 μm to about 20.0 μm or from about 10.0 μm to about 20.0 μm or from about 12.0 μm to about 20.0 μm or from about 7.0 μm to about 18.0 μm or from about 10.0 μm to about 18.0 μm or from about 12.0 μm to about 18.0 μm.

In particular embodiments such as in the fifth aspect of the present invention, the talc particulate has a $d_{95laser}$ equal to or less than about 20.0 μm and equal to or greater than about 7.0 μm. For example, the talc particulate may have a $d_{95laser}$ ranging from about 10.0 μm to about 20.0 μm or from about 12.0 μm to about 20.0 μm or from about 7.0 μm to about 18.0 μm or from about 10.0 μm to about 18.0 μm or from about 12.0 μm to about 18.0 μm.

The talc particulate may, for example, have a $d_{50laser}$ equal to or less than about 12.0 μm. For example, the talc particulate may have a $d_{50laser}$ equal to or less than about 11.0 μm or equal to or less than about 10.0 μm or equal to or less than about 9.0 μm or equal to or less than about 8.0 μm.

The talc particulate may, for example, have a $d_{50laser}$ equal to or greater than about 2.0 μm. For example, the talc particulate may have a $d_{50laser}$ equal to or greater than about 3.0 μm or equal to or greater than about 4.0 μm or equal to or greater than about 5.0 μm or equal to or greater than about 6.0 μm.

The talc particulate may have a $d_{50laser}$ ranging from about 2.0 μm to about 12.0 μm or from about 2.0 μm to about 10.0 μm or from about 3.0 μm to about 10.0 μm or from about 4.0 μm to about 10.0 μm or from about 2.0 μm to about 8.0 μm or from about 3.0 μm to about 8.0 μm or from about 4.0 μm to about 8.0 μm or from about 6.0 μm to about 8.0 μm.

In particular embodiments such as the fifth aspect of the present invention, the talc particulate has a $d_{50laser}$ equal to or greater than about 2.0 μm and equal to or less than about 8.0 μm. For example, the talc particulate may have a $d_{50laser}$ ranging from about 2.0 μm to about 8.0 μm or from about 3.0 μm to about 8.0 μm or from about 4.0 μm to about 8.0 μm or from about 5.0 μm to about 8.0 μm or from about 6.0 μm to about 8.0 μm.

The talc particulate may, for example, have a $d_{75laser}$ equal to or less than about 15.0 μm. The talc particulate may, for example, have a $d_{75laser}$ equal to or less than about 14.0 μm or equal to or less than about 13.0 μm or equal to or less than about 12.0 μm or equal to or less than about 11.0 μm or equal to or less than about 10.0 μm or equal to or less than about 9.0 μm or equal to or less than about 8.0 μm.

The talc particulate may, for example, have a $d_{75laser}$ equal to or greater than about 4.0 μm. For example, the talc particulate may have a $d_{75laser}$ equal to or greater than about 4.5 μm or equal to or greater than about 5.0 μm or equal to or greater than about 5.5 μm or equal to or greater than about 6.0 μm.

The talc particulate may, for example, have a $d_{75laser}$ ranging from about 4.0 μm to about 15.0 μm or from about 4.0 μm to about 12.0 μm or from about 4.0 μm to about 10.0 μm or from about 5.0 μm to about 10.0 μm.

The talc particulate may, for example, have a $d_{25laser}$ equal to or less than about 6.0 μm. The talc particulate may, for example, have a $d_{25laser}$ equal to or less than about 5.5 μm or equal to or less than about 5.0 μm or equal to or less than about 4.5 μm.

The talc particulate may, for example, have a $d_{25laser}$ equal to or greater than about 1.0 μm. For example, the talc particulate may have a $d_{25laser}$ equal to or greater than about 1.5 μm or equal to or greater than about 2.0 μm or equal to or greater than about 2.5 μm or equal to or greater than about 3.0 μm.

For example, the talc particulate may have a $d_{25laser}$ ranging from about 1.0 μm to about 6.0 μm or from about 1.5 μm to about 5.0 μm or from about 2.0 μm to about 4.5 μm.

The talc particulate may, for example, have a $d_{95sedi}$ equal to or less than about 10.0 μm. For example, the talc particulate may have a $d_{95sedi}$ equal to or less than about 9.0

μm or equal to or less than about 8.0 μm or equal to or less than about 7.0 μm or equal to or less than about 6.0 μm or equal to or less than about 5.0 μm.

The talc particulate may, for example, have a $d_{95sedi}$ equal to or greater than about 1.0 μm. For example, the talc particulate may have a $d_{95sedi}$ equal to or greater than about 1.5 μm or equal to or greater than about 2.0 μm or equal to or greater than about 2.5 μm or equal to or greater than about 3.0 μm or equal to or greater than about 3.5 μm or equal to or greater than about 4.0 μm.

The talc particulate may, for example, have a $d_{95sedi}$ ranging from about 1.0 μm to about 10.0 μm or from about 1.0 μm to about 8.0 μm or from about 1.0 μm to about 6.0 μm or from about 1.0 μm to about 5.0 μm or from about 2.5 μm to about 10.0 μm or from about 2.5 μm to about 8.0 μm or from about 2.5 μm to about 6.0 μm or from about 2.5 μm to about 5.0 μm.

In particular embodiments such as the fourth aspect of the present invention, the talc particulate has a $d_{95sedi}$ equal to or less than about 6.5 μm. For example, the talc particulate may have a $d_{95sedi}$ equal to or less than about 6.0 μm or equal to or less than about 5.5 μm or equal to or less than about 5.0 μm. For example, the talc particulate may have a $d_{95sedi}$ equal to greater than about 1.0 μm or equal to or greater than about 2.0 μm or equal to or greater than about 2.5 μm. For example, the talc particulate may have a $d_{95sedi}$ ranging from about 1.0 μm to about 6.5 μm or from about 1.0 μm to equal to or less than about 5.0 μm or from about 2.5 μm to about 6.5 μm or from about 2.5 μm to about equal to or less than about 5.0 μm.

In particular embodiments such as the fifth aspect of the present invention, the talc particulate has a $d_{95sedi}$ equal to or greater than about 1.0 μm and equal to or less than about 5.0 μm. For example, the talc particulate may have a $d_{95sedi}$ ranging from about 2.0 μm to equal to or less than about 5.0 μm or from about 2.5 μm to equal to or less than about 5.0 μm.

The talc particulate may, for example, have a $d_{50sedi}$ equal to or less than about 5.0 μm. For example, the talc particulate may have a $d_{50sedi}$ equal to or less than about 4.5 μm or equal to or less than about 4.0 μm or equal to or less than about 3.5 μm or equal to or less than about 3.0 μm or equal to or less than about 2.5 μm or equal to or less than about 2.0 μm.

The talc particulate may, for example, have a $d_{50sedi}$ equal to or greater than about 0.5 μm or equal to or greater than about 1.0 μm or equal to or greater than about 1.5 μm.

The talc particulate may, for example, have a $d_{50sedi}$ ranging from about 0.5 μm to about 5.0 μm or from about 0.5 μm to about 4.0 μm or from about 0.5 μm to about 3.0 μm or from about 0.5 μm to about 2.5 μm or from about 0.5 μm to about 2.0 μm.

In particular embodiments such as the fifth aspect of the present invention, the talc particulate has a $d_{50sedi}$ ranging from about 0.5 μm to about 2.5 μm.

The talc particulate may, for example, have a $d_{75sedi}$ equal to or less than about 6.0 μm. For example, the talc particulate may have a $d_{75sedi}$ equal to or less than about 5.0 μm or equal to or less than about 4.0 μm or equal to or less than about 3.0 μm.

The talc particulate may, for example, have a $d_{75sedi}$ equal to or greater than about 1.0 μm. For example, the talc particulate may have a $d_{75sedi}$ equal to or greater than about 1.5 μm or equal to or greater than about 2.0 μm.

The talc particulate may, for example, have a $d_{75sedi}$ ranging from about 1.0 μm to about 6.0 μm or from about 1.0 μm to about 4.0 μm or from about 1.0 μm to about 3.0 μm.

The talc particulate may, for example, have a $d_{25sedi}$ equal to or less than about 2.0 μm. For example, the talc particulate may have a $d_{25sedi}$ equal to or less than about 1.5 μm or equal to or less than about 1.0 μm.

The talc particulate may, for example, have a $d_{25sedi}$ equal to or greater than about 0.1 μm. For example, the talc particulate may have a $d_{25sedi}$ equal to or greater than about 0.2 μm or equal to or greater than about 0.5 μm.

The talc particulate may, for example, have a $d_{25sedi}$ ranging from about 0.1 μm to about 2.0 μm or from about 0.2 μm to about 1.0 μm or from about 0.5 μm to about 1.0 μm.

The decomposition temperature of the talc particulate (decomposition from talc to entstatite) of the present invention may, for example, be decreased compared to the decomposition temperature of a talc particulate not in accordance with the present invention. For example, the decomposition temperature of the talc particulate of the invention may be decreased by at least about 10° C. compared to a talc particulate not in accordance with the present invention. For example, the decomposition temperature of the talc particulate of the invention may be decreased by at least about 15° C. or at least about 20° C. or at least about 25° C. or at least about 30° C. compared to a talc particulate not in accordance with the present invention. For example, the decomposition temperature may be decreased by up to about 200° C. compared to a talc particulate not in accordance with the present invention. For example, the decomposition temperature may be decreased by up to about 180° C. or up to about 160° C. or up to about 150° C. or up to about 140° C. or up to about 120° C. or up to about 100° C. compared to a talc particulate not in accordance with the present invention. The talc particulate not in accordance with the present invention may, for example, be a commercial talc particulate such as Luzenac HAR T84 talc®. Luzenac HAR T84 talc® has a $d_{50sedi}$ of about 1.9 μm, a $d_{95sedi}$ of about 10.5 μm, a $d_{50laser}$ of about 10.5 μm, a $d_{95laser}$ of about 32.1 μm, a BET surface area of about 19.4 $m^2/g$, about 130 TOT layers, a shape factor of about 123 and a DI(TOT) of about 95. Decomposition temperature may, for example, be measured by thermogravimetric analysis (TGA) at temperatures ranging from 50° C. to 1000° C. under $N_2$ flow and an increased temperature rate of 10° C./min.

The cation exchange capacity (CEC) of the talc particulate of the present invention may, for example, be increased compared to the CEC of a talc particulate not in accordance with the present invention. For example, the CEC of the talc particulate of the invention may be increased by about 5% compared to a talc particulate not in accordance with the present invention. For example, the CEC of the talc particulate of the invention may be increased by about 10% or by about 15% or by about 20% or by about 25% compared to a talc particulate not in accordance with the present invention. For example, the CEC of the talc particulate may be increased by up to about 50% or up to about 45% or up to about 40% or up to about 35% or up to about 30% compared to a talc particulate not in accordance with the present invention. The talc particulate not in accordance with the present invention may, for example, be a commercial talc particulate such as Luzenac HAR T84 talc®. Luzenac HAR T84 talc® has a $d_{50sedi}$ of about 1.9 μm, a $d_{95sedi}$ of about 10.5 μm, a $d_{50laser}$ of about 10.5 μm, a $d_{95laser}$ of about 32.1 μm, a BET surface area of about 19.4 $m^2/g$, about 130 TOT layers, a shape factor of about 123 and a DI(TOT) of about 95. CEC may, for example, be measured by ISO 11260 or AFNOR NFX 31-130.

Particle Surface Properties

BET surface area refers to the area of the surface of the particles of the talc particulate with respect to unit mass, determined according to the BET method by the quantity of nitrogen adsorbed on the surface of said particles so as to form a monomolecular layer completely covering said surface (measurement according to the BET method, AFNOR standard X11-621 and 622 or ISO 9277). Details of the BET specific surface area measurement method used in the preparation of the present application are set out in the Examples.

The talc particulate may, for example, have a BET surface area equal to or greater than about 15 $m^2/g$. For example, the talc particulate may have a BET surface area equal to or greater than about 16 $m^2/g$ or equal to or greater than about 17 $m^2/g$ or equal to or greater than about 18 $m^2/g$ or equal to or greater than about 19 $m^2/g$ or equal to or greater than about 20 $m^2/g$ or equal to or greater than about 21 $m^2/g$ or equal to or greater than about 22 $m^2/g$.

The talc particulate may, for example, have a BET surface area equal to or less than about 30 $m^2/g$. For example, the talc particulate may have a BET surface area equal to or less than about 29 $m^2/g$ or equal to or less than about 28 $m^2/g$ or equal to or less than about 27 $m^2/g$ or equal to or less than about 26 $m^2/g$ or equal to or less than about 25 $m^2/g$.

The talc particulate may, for example, have a BET surface area ranging from about 15 $m^2/g$ to about 30 $m^2/g$ or from about 17 $m^2/g$ to about 30 $m^2/g$ or from about 20 $m^2/g$ to about 28 $m^2/g$ or from about 20 $m^2/g$ to about 25 $m^2/g$.

The oil absorption of a talc particulate may be determined according to ASTM-D 1483-95 or ISO 787-5 using linseed oil. The oil absorption in weight percentage may be calculated as follows:

$$\text{Oil Absorption (wt. \%)} = \frac{\text{Volume Oil Used (mL)} \times \text{Specific Gravity of Oil}}{\text{Weight of Sample (g)}} \times 100$$

The oil absorption in ml/100 g may be calculated as follows:

$$\text{Oil Absorption}\left(\text{mL/100 g}\right) = \frac{\text{Volume Oil Used (mL)}}{\text{Weight of Sample (g)}} \times 100$$

Details of the oil absorption measurement method used in the preparation of the present application are set out in the Examples.

The talc particulate may, for example, have an oil absorption equal to or greater than about 65 mL/100 g. For example, the talc particulate may have an oil absorption equal to or greater than about 66 mL/100 g or equal to or greater than about 67 mL/100 g or equal to or greater than about 68 mL/100 g or equal to or greater than about 69 mL/100 g or equal to or greater than about 70 mL/100 g.

The talc particulate may, for example, have an oil absorption equal to or less than about 100 mL/100 g. For example, the talc particulate may have an oil absorption equal to or less than about 90 mL/100 g or equal to or less than about 80 mL/100 g or equal to or less than about 75 mL/100 g.

The talc particulate may, for example, have an oil absorption ranging from about 65 mL/100 g to about 100 mL/100 g or from about 68 mL/100 g to about 100 mL/100 g or from about 65 mL/100 g to about 80 mL/100 g or from about 68 mL/100 g to about 80 mL/100 g or from about 68 mL/100 g to about 75 mL/100 g.

Contact angle may be measured using FibroDat equipment, for example DAT Dynamic Absorption Tester Model 68-96, for example in accordance with TAPPI T558 & ASTM D-5725, wherein the test liquid is water. Details of the contact angle measurement method used in the preparation of the present application are set out in the Examples.

The talc particulate may, for example, have a contact angle equal to or less than about 43°. For example, the talc particulate may have a contact angle equal to or less than about 42° or equal to or less than about 41° or equal to or less than about 40° or equal to or less than about 39° or equal to or less than about 38°.

The talc particulate may, for example, have a contact angle equal to or greater than about 33°. For example, the talc particulate may have a contact angle equal to or greater than about 34° or equal to or greater than about 35° or equal to or greater than about 36°.

The talc particulate may, for example, have a contact angle ranging from about 33° to about 43° or from about 33° to about 40° or from about 35° to about 40°.

Optional Surface Treatment

In certain embodiments, the talc particulate is treated with a surface treatment agent. Surface treated talc may, for example, be referred to as coated talc. Surface treatment of the talc may serve to reduce or eliminate aggregation of the talc particulates and/or enhance incorporation of the talc particulate into a polymer composition.

In certain embodiments, the talc particulate is not treated with a surface treatment agent (uncoated talc).

Suitable surface treatment agents include a compound with hydrophobic carbon chains bearing polar radicals, for example, the family of amines, silanes, siloxanes, alcohols or acids and metals salts thereof.

In certain embodiments, surface treatment agent is a polyether or a derivative thereof, for example, polyether modified polysiloxane.

In certain embodiments, the polyether is a polyoxyalkylene (POA), for example, polyalkylene glycol (PAG) or polyalkylene oxide (PAO). As used herein, the term 'polyalkylene glycol' means a POA having a number average molecular mass below 20,000 g/mol, and the term 'polyalkylene oxide' means a POA having a number average molecular mass above 20,000 g/mol. In certain embodiments, the surface treatment agent comprises or is a polyalkylene glycol having a number average molecular mass of from about 100 to about 15,000 g/mo, for example, from about 200 to about 10,000 g/mol, or from about 500 to about 9000 g/mol, or from about 1000 to about 9000 g/mol, or from about 2000 to about 900 g/mol, or from about 4000 to about 9000 g/mol, or from about 6000 to about 9000 g/mol, or from about 6000 to about 8500 g/mol.

In certain embodiments, the polyether is a polyalkylene oxide selected from one or more of paraformaldehyde (polymethylene oxide), polytetramethylene glycol, polytetramehtylene ether glycol, polyethylene oxide, polypropylene oxide, polybutylene oxide, and combinations thereof.

In certain embodiments, the surface treatment agent comprises or is polyethylene glycol. In certain embodiments, the surface treatment comprises or is a mixture of polyethylene glycol and polypropylene glycol (PPG). In certain embodiments, the surface treatment agent is polyethylene glycol having a number average molecular mass of from about 200 to about 10,000 g/mol, for example, from about 500 to about 9000 g/mol, or from about 1000 to about 9000 g/mol, or from about 2000 to about 900 g/mol, or from about 4000 to about 9000 g/mol, or from about 6000 to about 9000 g/mol, or from about 6000 to about 8500 g/mol. An exemplary PEG includes the Puriol™ range of polyglycols from BASF, for example, Puriol™ 8005.

In certain embodiments, the surface treatment agent comprises or is a fatty acid, and/or a metal salt thereof, for example, stearic acid or a metal stearate, such as magnesium, calcium or zinc stearate. This includes fatty acids having a carbon chain length from C8 to C24 and mixtures of fatty acids having a carbon chain length from C8 to C24.

Suitable silane based agents are aminosilanes, for example, trimethoxysilyl ethyl amine, triethoxysilyl ethyl amine, tripropoxysilyl ethyl amine, tributoxysilyl ethyl amine, trimethoxysilyl propyl amine, triethoxysilyl propyl amine, tripropoxysilyl propyl amine, triisopropoxysilyl propyl amine, tributoxysilyl propyl amine, trimethoxysilyl butyl amine, triethoxysilyl butyl amine, tripropoxysilyl butyl amine, tributoxysilyl butyl amine, trimethoxysilyl pentyl amine, triethoxysilyl pentyl amine, tripropoxysilyl pentyl amine, tributoxysilyl pentyl amine, trimethoxysilyl hexyl amine, triethoxysilyl hexyl amine, tripropoxysilyl hexyl amine, tributoxysilyl hexyl amine, trimethoxysilyl heptyl amine, triethoxysilyl heptyl amine, tripropoxysilyl heptyl amine, tributoxysilyl heptyl amine, trimethoxysilyl octyl amine, triethoxysilyl octyl amine, tripropoxysilyl octyl amine, tributoxysilyl octyl amine, and the like. Suitable agents having a hydrocarbyl group and a polar group are hydrocarbyl amines such as triethanolamine (TEA), and amino alcohol agents such as 2-amino-2-methyl-1-propanol. AMP-95® is a commercially available 2-amino-2-methyl-1-propanol formulation containing 5% water.

The surface treatment agent may be added in an amount effective to achieve the desired result. In certain embodiments, the quantity of surface treatment agent is from about 0.1% to 5% by weight with respect to the weight of talc, for example, from about 0.1% to 2% by weight with respect to the weight of talc.

Surface treatment agents may be applied by adding to the talc particulate and mixing using conventional methods. Surface treatment agents may be applied during preparation of the talc particulate from a relative coarse talc starting material and before the talc particulate is added to a polymer composition.

Method for Making the Talc Particulate

There is also provided herein a method for making a talc particulate, the method comprising classifying a feed talc material to remove a portion of the largest particles in the feed talc material, wherein the feed talc material has one or more of the following:

(a) a lamellarity index equal to or greater than about 2.5;
(b) a $d_{95sedi}$ equal to or less than about 15.0 μm;
(c) a $d_{95laser}$ equal to or less than about 40.0 μm;
(d) a $d_{50sedi}$ equal to or less than about 5.0 μm;
(e) a shape factor equal to or greater than about 40;
(f) a BET surface area equal to or greater than about 10 $m^2/g$.

The talc particulate may be in accordance with any aspect or embodiment described herein.

Classification refers to a process in which particles of the feed talc material are separated by size. Classification may, for example, take place by any suitable method including, for example, air classification, sieve analysis and sedimentation. The classification may, for example, be dry classification.

In the method described herein a portion of the largest particles of the feed talc material are removed. Thus, the talc particulate of the present invention is the fine talc particles that remain after the larger particles are removed.

In other words, the feed talc material can be classified to split the material into two fractions. The fine fraction is the talc particulate of the present invention. The coarse fraction is a by-product.

The proportion of larger particles that are removed can be selected depending on the target particle size distribution for the talc particulate. For example, from about 10 wt % to about 95 wt % of the largest particles may be removed to make the talc particulate. For example, from about 20% to about 95 wt % or from about 30 wt % to about 95 wt % or from about 40 wt % to about 95 wt % or from about 50 wt % to about 95 wt % or from about 60 wt % to about 95 wt % or from about 70 wt % to about 95 wt % or from about 80 wt % to about 95 wt % or from about 80 wt % to about 90 wt % of the largest particles may be removed to make the talc particulate.

The amount of the fine fraction may be directly correlated to the speed of the classifying turbine. The faster the classifier speed, the smaller the fine product yield (%). The faster the classifier speed, the lower the top cut (e.g. $d_{95}$ or $d_{95}$) of the fine fraction. Thus, the speed of the classifying turbine can be adjusted depending on the desired particle size and product yield.

Where the feed talc material is a dry compacted grade, the feed talc material may be pulverized prior to classification. Pulverization can be performed using equipment such as an attritor mill, a pin mill, a long gap mill, or a low pressure jet mill. The pulverization assists to deagglomerate the compacted feed talc material such that the feed talc material following pulverization is composed exclusively of independent particles (rather than agglomerates).

Exemplary system operating parameters for the pulverization methods described above are provided in the tables below.

| Atritor | Twin screw speed (Hz) | Besta speed (%) | Mill speed (rpm) | Burner temperature (° C.) | Product outlet temperature (° C.) | Air flowrate ($m^3/h$) | Cyclone (nbr) |
|---|---|---|---|---|---|---|---|
| Range | 0-80 | 0-40 | 0-1725 | 0-250 | 90-120 | 0-4000 | 1-2 |
| Example Trial value | 80 (3 kg/min) | 35 | 1725 | 250 | 105-120 | 2500 | 1 |

| Pin mill | Vibrating feeder height | Rotating speed (rpm) | Cyclone (nbr) |
|---|---|---|---|
| Range | 3-24 | 5000-20000 | 1 |
| Example Trial value | 6 | 5000, 8000, 12000, 16000 | 1 |

| Long gap Mill | Feedrate (kg/h) | Rotating speed (rpm) | Cyclone (nbr) | Burner temperature (° C.) | Blades (nbr) | Additive coating (pump rpm) |
|---|---|---|---|---|---|---|
| Range | 0-400 | 0-6000 | 1-2 | 0-150 | 0-16 | 10-150 (viscosity <1000 cP −>5 rpm = 21.2 g) |
| Example Trial value | 300 | 3000, 6000 | 2 | 0 | 16 | 0 |

| Jetmill | Feedrate (kg/h) | Pressure (bar) | Classifying speed (rpm) | Nozzle diameter (mm) |
|---|---|---|---|---|
| Range | 0-200 | 0-10 | 0-8000 | 10-28 |
| Trial value | 110-160 | 0.5-1 | 1000-1300 | 10-28 |

The feed talc material may, for example, have a bi-modal particle size distribution curve (having 2 peaks) prior to pulverization. The pulverization may, for example, transform the bimodal particle size distribution curve into a mono-modal particle size distribution curve (having 1 peak).

Feed Talc Material

The feed talc material used to make the talc particulate of the present invention may have one or more of the following:

(a) a lamellarity index equal to or greater than about 2.5;
(b) a $d_{95sedi}$ equal to or less than about 15.0 μm;
(c) a $d_{95laser}$ equal to or less than about 40.0 μm;
(d) a $d_{50sedi}$ equal to or less than about 5.0 μm;
(e) a $d_{50laser}$ equal to or less than about 15.0 μm;
(f) a shape factor equal to or greater than about 40;
(g) a BET surface area equal to or greater than about 10 $m^2/g$;
(h) a DI(TOT) equal to or less than about 102;
(i) equal to or greater than about 110 TOT layers.

For example, the feed talc material may have two or more, three or more, four or more, five or more, or six or more, or seven or more, or eight or more, or nine of properties (a) to (i).

The particle shape, size and surface properties of the feed talc material may be measured in the same way as for the talc particulate of the present invention described herein.

The feed talc material may, for example, have a lamellarity index equal to or greater than about 2.5 or equal to or greater than about 2.8 or equal to or greater than about 3.0 or equal to or greater than about 3.5 or equal to or greater than about 4.0 or equal to or greater than about 4.5. The feed talc material may, for example, have a lamellarity index equal to or less than about 8.0 or equal to or less than about 7.0 or equal to or less than about 6.0. For example, the feed talc material may have a lamellarity index ranging from about 2.8 to about 8.0 or from about 3.0 to about 7.0 or from about 4.0 to about 6.0.

The feed talc material may, for example, have a $d_{95sedi}$ equal to or less than about 15.0 μm. For example, the feed talc material may have a $d_{95sedi}$ equal to or less than about 14.0 μm or equal to or less than about 13.0 μm or equal to or less than about 12.0 μm. The feed talc material may, for example, have a $d_{95sedi}$ equal to or greater than about 8.0 μm or equal to or greater than about 9.0 μm or equal to or greater than about 10.0 μm. For example, the feed talc material may have a $d_{95sedi}$ ranging from about 8.0 μm to about 15.0 μm or from about 10.0 μm to about 15.0 μm or from about 10.0 μm to about 12.0 μm.

The feed talc material may, for example, have a $d_{50sedi}$ equal to or less than about 5.0 μm. For example, the feed talc material may have a $d_{50sedi}$ equal to or less than about 4.0 μm or equal to or less than about 3.0 μm or equal to or less than about 2.0 μm. The feed talc material may, for example, have a $d_{50sedi}$ equal to or greater than about 0.5 μm or equal to or greater than about 1.0 μm or equal to or greater than about 1.5 μm. For example, the feed talc material may have a $d_{50sedi}$ ranging from about 0.5 μm to about 5.0 μm or from about 1.0 μm to about 3.0 μm.

The feed talc material may, for example, have a $d_{95laser}$ equal to or less than about 40.0 μm. For example, the feed talc material may have a $d_{95laser}$ equal to or less than about 38.0 μm or equal to or less than about 36.0 μm or equal to or less than about 35.0 μm or equal to or less than about 34.0 μm. The feed talc material may, for example, have a $d_{95laser}$ equal to or greater than about 20.0 μm or equal to or greater than about 25.0 μm or equal to or greater than about 30.0 μm. For example, the feed talc material may have a $d_{95sedi}$ ranging from about 20.0 μm to about 40.0 μm or from about 25.0 μm to about 35.0 μm or from about 30.0 μm to about 35.0 μm.

The feed talc material may, for example, have a $d_{50laser}$ equal to or less than about 15.0 μm. For example, the feed talc material may have a $d_{50laser}$ equal to or less than about 14.0 μm or equal to or less than about 13.0 μm or equal to or less than about 12.0 μm or equal to or less than about 11.0 μm. The feed talc material may, for example, have a $d_{50laser}$ equal to or greater than about 8.0 μm or equal to or greater than about 9.0 μm or equal to or greater than about 10.0 μm. For example, the feed talc material may have a $d_{50laser}$ ranging from about 8.0 μm to about 15.0 μm or from about 9.0 μm to about 12.0 μm.

The feed talc material may, for example, have a shape factor equal to or greater than about 40. For example, the feed talc material may have a shape factor equal to or greater than about 60 or equal to or greater than about 80 or equal to or greater than about 100 or equal to or greater than about 120. The feed talc material may, for example, have a shape factor equal to or less than about 200 or equal to or less than about 180 or equal to or less than about 160 or equal to or less than about 140 or equal to or less than about 130. For example, the feed talc material may have a shape factor ranging from about 40 to about 200 or from about 80 to about 180 or from about 100 to about 160 or from about 110 to about 140 or from about 120 to about 130.

The feed talc material may, for example, have a BET surface area equal to or greater than about 10 $m^2/g$. For example, the feed talc material may have a BET surface area equal to or greater than about 12 $m^2/g$ or equal to or greater than about 14 $m^2/g$ or equal to or greater than about 15 $m^2/g$ or equal to or greater than about 16 $m^2/g$ or equal to or greater than about 18 $m^2/g$. The feed talc material may, for example, have a BET surface area equal to or less than about 30 $m^2/g$ or equal to or less than about 25 $m^2/g$ or equal to or less than about 20 $m^2/g$. For example, the feed talc material may have a BET surface area ranging from about 10 $m^2/g$ to about 30 $m^2/g$ or from about 12 $m^2/g$ to about 25 $m^2/g$ or from about 14 $m^2/g$ to about 23 $m^2/g$ or from about 16 $m^2/g$ to about 20 $m^2/g$. The feed talc material may, for example have a DI(TOT) equal to or less than about 102. For example, the feed talc material may have a DI(TOT) equal to or less than about 100 or equal to or less than about 99 or equal to or less than about 98 or equal to or less than about 97 or equal to or less than about 96 or equal to or less than about 95. The feed talc material may, for example, have a DI(TOT) equal to or greater than about 80 or equal to or greater than about 85 or equal to or greater than about 90. For example, the feed talc material may have a DI(TOT) ranging from about 80 to about 102 or from about 85 to about 98 or from about 90 to about 97.

The feed talc material may, for example, have equal to or greater than about 110 TOT layers. For example, the feed talc material may have equal to or greater than about 115 TOT layers or equal to or greater than about 120 TOT layers or equal to or greater than about 125 TOT layers or equal to or greater than about 130 TOT layers. The feed talc material may, for example, have equal to or less than about 150 or equal to or less than about 145 or equal to or less than about 140 TOT layers. For example, the feed talc material may have from about 110 to about 150 or from about 120 to about 150 TOT layers or from about 125 to about 145 TOT layers.

For example, where the feed talc material has not been pulverized, the feed talc material may have equal to or greater than about 120 TOT layers. For example, where the feed talc material has not been pulverized, the feed talc material may have equal to or greater than about 125 TOT layers or equal to or greater than about 130 TOT layers. For example, where the feed talc material has not been pulverized, the feed talc material may have equal to or less than about 150 or equal to or less than about 145 or equal to or less than about 140 TOT layers.

For example, where the feed talc material has been pulverized, the feed talc material may have less than about 120 TOT layers, for example between about 110 and about 120 TOT layers or between about 115 and about 120 TOT layers.

The feed talc material may, for example, have one or more of the following:

(a) a $d_{50sedi}$ of about 2 μm;
(b) a $d_{95sedi}$ of about 9 μm to about 10 μm;
(c) a $d_{50laser}$ of about 10 μm;
(d) a $d_{95laser}$ of about 32 μm;
(e) a BET surface area of about 12 $m^2/g$ to about 20 $m^2/g$;
(f) about 130 TOT layers;
(g) a shape factor of about 123;
(h) a DI(TOT) of about 95;
(i) a lamellarity index of about 4.

Polymer Composition

The talc particulates described herein may be used as a filler in a polymer composition. The talc particulate may be used as an extender filler or a functional filler. As used herein, the term “functional filler” is understood to mean an additive incorporated into a polymeric composition with a view to enhancing one or more of its physical (e.g., mechanical) properties. An “extender filler” typically modifies the properties of the polymer composition very little and essentially serves to reduce cost. Thus, there is also provided herein a polymer composition comprising a talc particulate as described herein.

In certain embodiments, the talc particulate may be used as a functional filler in a polymer composition, for example, to modify or enhance one or more mechanical properties of the polymer composition.

In certain embodiments, the talc particulate is used as an extended filler, for example, to supplement or supplant other filler materials, which may be more expensive or more difficult to incorporate into the polymer composition.

The talc particulate may, for example, be present in the polymer composition in an amount equal to or greater than about 1 wt % based on the total weight of the polymer composition. For example, the talc particulate may be present in the polymer composition in an amount equal to or greater than about 5 wt % or equal to or greater than about 10 wt % or equal to or greater than about 15 wt % or equal to or greater than about 20 wt % or equal to or greater than about 25 wt % or equal to or greater than about 30 wt % or equal to or greater than about 35 wt % based on the total weight of the polymer composition.

The talc particulate may, for example, be present in the polymer composition in an amount equal to or less than about 70 wt % based on the total weight of the polymer composition. For example, the talc particulate may be present in the polymer composition in an amount equal to or less than about 65 wt % or equal to or less than about 60 wt % or equal to or less than about 55 wt % or equal to or less than about 50 wt % or equal to or less than about 45 wt % or equal to or less than about 40 wt % based on the total weight of the polymer composition.

The talc particulate may, for example, be present in the polymer composition in an amount ranging from about 1 wt % to about 70 wt % or from about 5 wt % to about 60 wt % or from about 10 wt % to about 50 wt % or from about 10 wt % to about 40 wt % or from about 10 wt % to about 30 wt %.

The polymer composition may comprise filler other than the talc particulate including, but not limited to, an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, mica, perlite, feldspars, nepheline syenite, wollastonite, diatomaceous earth, barite, glass, and natural or synthetic silica or silicates. In certain embodiments, the polymer composition may comprise a talc other than the talc particulate of the present invention. In certain embodiments, the polymer composition does not comprise talc other than the talc particulate of the present invention.

The filler compounds other than the talc particulate may be included during preparation of the polymer composition, or alternatively, during preparation of the talc particulate, e.g., the talc particulate may be mixed and blended with the other filler compound(s), and optionally combined with surface treatment agent.

In certain embodiments, the amount of other filler compound(s) is present in amount less than about 10% by weight, based on the total weight of the polymer composition, for example, less than about 5% by weight, or less than about 1% by weight, or less than about 0.5% by weight, or less than about 0.4% by weight, or less than about 0.3% by weight, or less than about 0.2% by weight, or less than about 0.1% by weight.

The polymer composition may comprise any natural or synthetic polymer or mixture thereof. The polymer may, for example, be thermoplastic or thermoset. The term “polymer” used herein includes homopolymers and/or copolymers, as well as crosslinked and/or entangled polymers.

The term "precursor" as may be applied to the polymer component will be readily understood by one of ordinary skill in the art. For example, suitable precursors may include one or more of: monomers, cross-linking agents, curing systems comprising cross-linking agents and promoters, or any combination thereof. Where the talc particulate is mixed with precursors of the polymer, the polymer composition will subsequently be formed by curing and/or polymerising the precursor components to form the desired polymer.

Polymers, including homopolymers and/or copolymers, comprised in the polymer composition of the present invention may be prepared from one or more of the following monomers: acrylic acid, methacrylic acid, methyl methacrylate, and alkyl acrylates having 1-18 carbon atoms in the alkyl group, styrene, substituted styrenes, divinyl benzene, diallyl phthalate, butadiene, vinyl acetate, acrylonitrile, methacrylonitrile, maleic anhydride, esters of maleic acid or fumaric acid, tetrahydrophthalic acid or anhydride, itaconic acid or anhydride, and esters of itaconic acid, with or without a cross-linking dimer, trimer, or tetramer, crotonic acid, neopentyl glycol, propylene glycol, butanediols, ethylene glycol, diethylene glycol, dipropylene glycol, glycerol, cyclohexanedimethanol, 1,6 hexanediol, trimethyolpropane, pentaerythritol, phthalic anhydride, isophthalic acid, terephthalic acid, hexahydrophthalic anyhydride, adipic acid or succinic acids, azelaic acid and dimer fatty acids, toluene diisocyanate and diphenyl methane diisocyanate.

The polymer may be selected from one or more of polymethylmethacrylate (PMMA), polyacetal, polycarbonate, polyvinyls, polyacrylonitrile, polybutadiene, polystyrene, polyacrylate, polyethylene, polypropylene, epoxy polymers, unsaturated polyesters, polyurethanes, polycyclopentadienes and copolymers thereof. Suitable polymers also include liquid rubbers, such as silicones.

The polymers which may be used in accordance with the invention are advantageously thermoplastic polymers. Thermoplastic polymers are those which soften under the action of heat and harden again to their original characteristics on cooling, that is, the heating-cooling cycle is fully reversible. By conventional definition, thermoplastics are straight and branched linear chain organic polymers with a molecular bond. Examples of polymers which may be used in accordance with the invention include, but are not limited to polyethylene, for example, linear low density polyethylene (LLDPE) and medium density grades thereof, high density polyethylene (HDPE), low density polyethylene (LDPE), polypropylene (PP), polyethylene terephthalate (PET), vinyl/polyvinyl chloride (PVC), polystyrene, and mixtures thereof.

In certain embodiments, the polymer is a polyalkylene polymer, for example, polyethylene, polypropylene, polybutylene, or a copolymer of two or more of ethylene, propylene and butylenes monomers, for example, an ethylene-propylene copolymer. In certain embodiments, the polymer is a mixture of two or more of propylene, polyethylene and ethylene-propylene copolymer, for example a mixture of propylene and polyethylene.

In certain embodiments, the polymer comprises, consists essentially of, or consists of polypropylene or polyethylene or a mixture of polypropylene and polyethylene. In certain embodiments, the polymer is polypropylene.

The presence of the talc particulate in the polymer composition may, for example, increase the flexural modulus and/or the impact strength of the polymer composition.

The precise flexural modulus and impact strength of the polymer composition may vary depending on the exact polymer used and any other components in the polymer composition.

The polymer composition may, for example, have a flexural modulus that is at least about 1.0% greater than the flexural modulus of a polymer composition that is identical except that it does not comprise the talc particulate of the present invention. For example, the polymer composition may have a flexural modulus that is at least about 2.0% greater or at least about 3.0% greater or at least about 4.0% greater or at least about 5.0% greater than the flexural modulus of a polymer composition that is identical except that it does not comprise the talc particulate of the present invention.

The polymer composition may, for example, have a flexural modulus that is up to about 50.0% greater than the flexural modulus of a polymer composition that is identical except that it does not comprise the talc particulate of the present invention. For example, the polymer composition may have a flexural modulus that is up to about 45.0% or up to about 40.0% or up to about 35.0% or up to about 30.0% or up to about 25.0% or up to about 20.0% or up to about 15.0% or up to about 10.0% greater than the flexural modulus of a polymer composition that is identical except that it does not comprise the talc particulate of the present invention.

The polymer composition may, for example, have a flexural modulus that is from about 1.0% to about 50.0% or from about 2.0% to about 30.0% or from about 3.0% to about 20.0% or from about 4.0% to about 10.0% greater than the flexural modulus of a polymer composition that is identical except that it does not comprise the talc particulate of the present invention.

Flexural modulus may be measured on 80 mm by 10 mm by 4 mm bars according to ISO 178 (span between specimen supports=64 mm, test speed=1 mm/s, flexural strain=0.3% max, measured on at least 7 specimens).

The polymer composition may, for example, have an impact strength that is at least about 1.0% greater than the impact strength of a polymer composition that is identical except that it does not comprise the talc particulate of the present invention. For example, the polymer composition may have an impact strength that is at least about 5.0% greater or at least about 10.0% greater or at least about 15.0% greater than the impact strength of a polymer composition that is identical except that it does not comprise the talc particulate of the present invention.

The polymer composition may, for example, have an impact strength that is up to about 50.0% greater than the impact strength of a polymer composition that is identical except that it does not comprise the talc particulate of the present invention. For example, the polymer composition may have an impact strength that is up to about 45.0% or up to about 40.0% or up to about 35.0% greater than the impact strength of a polymer composition that is identical except that it does not comprise the talc particulate of the present invention.

The polymer composition may, for example, have an impact strength that is from about 1.0% to about 50.0% or from about 5.0% to about 40.0% or from about 10.0% to about 40.0% or from about 15.0% to about 30.0% greater than the impact strength of a polymer composition that is identical except that it does not comprise the talc particulate of the present invention.

Impact strength may refer to Charpy impact strength or falling weight impact strength as described herein.

Charpy impact strength (KJ/m) (unnotched flatwise and normal impact) may be measured on 80 mm by 10 mm by 4 mm bars according to ISO 179-1 at −20° C. Falling weight index (J) at −21° C. may be measured on 60*60 *3 mm plaques according to EN ISO 6603:2.

The impact strength (e.g. Charpy impact strength) may be recalculated to place it at ISO flexural modulus. This is determined by extruding polymer compositions at different talc loadings using a comparative talc and a talc particulate of the present invention. Flexural modulus and impact strength are then measured for each composition. The curves for flexural modulus versus talc loading are plotted. On the curve flexural modulus vs talc loading for the talc particulate of the present invention, the loading of the talc particulate of the present invention corresponding to the same flexural modulus as the comparative talc at 20% talc loading is calculated. The curve impact strength versus talc loading for the talc particulate of the present invention is then plotted. The impact strength at ISO flexural modulus is the impact strength corresponding to the talc loading that provides the same flexural modulus as the comparative talc at 20% talc loading.

The polymer composition may have a scratch resistance, ΔL*, of no greater than about 4.0, or no greater than about 3.5, or no greater than about 3.2, or no greater than about 3.1, or no greater than about 3.0, or no greater than about 2.9. The polymer composition may have a scratch resistance, ΔL*, of no less than about 2.0, or no less than about 2.5, or no less than about 2.7, or no less than about 2.8, or no less than about 2.9. The polymer composition may have a scratch resistance, ΔL*, from about 2.0 to about 4.0, or from about 2.5 to about 3.5, or from about 2.7 to about 3.2, or from about 2.7 to about 3.1, or from about 2.7 to about 3.0, or from about 2.7 to about 2.9, or from about 2.8 to about 3.2, or from about 2.9 to about 3.2, or from about 2.8 to about 3.0. The scratch resistance may be determined by Erichsen scratch test according to GMW 14688 Method A with a load of 10N.

In the Erichsen scratch test, a cross-hatched pattern is scratched onto the surface of a material sample under a defined mechanical load using an Erichsen scratch tester having a cylindrical hard metal pen with a polished, ball-shaped end of radius (0.5±0.01) mm. The pen is scratched over greater than or equal to 40 mm of the surface at a speed of (1000±50) mm/minute. The brightness or luminance (measured in terms of L* in the CIELAB colour space) of the scratched region, $L^*_S$, is compared to the brightness of an unscratched region, $L^*_U$, to quantify the visibility of the scratched region in terms of scratch resistance parameter ΔL* defined according to:

$$\Delta L^* = L^*_S - L^*_U.$$

Brightness values can be determined using a spectrophotometer fulfilling the requirements of ISO 7724, for example, a Konica Minolta CM-3700d spectrophotometer (available from Konica Minolta Sensing Europe B.V.) with SCE excluded, D65 illuminant, 10 nm spectral interval, reflection measurement, d/8 geometry, 25 mm or 27 mm diameter porthole, and color space CIE LAB 1964 (10°). Scratches are more visible in materials having higher values of ΔL* and consequently such materials are described as being less scratch resistant.

The polymer composition may have a coefficient of linear thermal expansion, in a direction parallel to the direction of injection, of no less than about 60×10$^{-6}$° C.-1, for example, no less than about 65×10$^{-6}$° C.$^{-1}$, or no less than about 70×10$^{-6}$° C.$^{-1}$, or no less than about 75×10$^{-6}$° C.$^{-1}$, or no less than about 80×10$^{-6}$° C.$^{-1}$, or no less than about 85×10$^{-6}$° C.$^{-1}$, or no less than about 90×10$^{-6}$° C.$^{-1}$. The polymer composition may have a coefficient of linear thermal expansion, in a direction parallel to the direction of injection, of no greater than about 100×10$^{-6}$° C.$^{-1}$, for example, no greater than about 95×10$^{-6}$° C.$^{-1}$, or no greater than about 90×10$^{-6}$° C.$^{-1}$, or no greater than about 85×10$^{-6}$° C.$^{-1}$, or no greater than about 80×10$^{-6}$° C.$^{-1}$, or no greater than about 75×10$^{-6}$° C.$^{-1}$, or no greater than about 70×10$^{-6}$° C.$^{-1}$. The polymer composition may have a coefficient of linear thermal expansion, in a direction parallel to the direction of injection, from about 60×10$^{-6}$° C.$^{-1}$ to about 100×10$^{-6}$° C.$^{-1}$, for example, from about 60×10$^{-6}$° C.$^{-1}$ to about 90×10$^{-6}$° C.$^{-1}$, or from about 60×10$^{-6}$° C.$^{-1}$ to about 80×10$^{-6}$° C.$^{-1}$, or from about 70×10$^{-6}$° C.$^{-1}$ to about 100×10$^{-6}$° C.$^{-1}$, or from about 80×10$^{-6}$° C.$^{-1}$ to about 100×10$^{-6}$° C.$^{-1}$.

The polymer composition may have a coefficient of linear thermal expansion, in a direction perpendicular to the direction of injection, of no less than about 60×10$^{-6}$° C.$^{-1}$ for example, no less than about 65×10$^{-6}$° C.$^{-1}$, or no less than about 70×10$^{-6}$° C.$^{-1}$, or no less than about 75×10$^{-6}$° C.$^{-1}$, or no less than about 80×10$^{-6}$° C.$^{-1}$, or no less than about 85×10$^{-6}$° C.$^{-1}$, or no less than about 90×10$^{-6}$° C.$^{-1}$. The polymer composition may have a coefficient of linear thermal expansion, in a direction perpendicular to the direction of injection, of no greater than about 100×10$^{-6}$° C.$^{-1}$, for example, no greater than about 95×10$^{-6}$° C.$^{-1}$, or no greater than about 90×10$^{-6}$° C.$^{-1}$, or no greater than about 85×10$^{-6}$° C.$^{-1}$, or no greater than about 80×10$^{-6}$° C.$^{-1}$, or no greater than about 75×10$^{-6}$° C.$^{-1}$, or no greater than about 70×10$^{-6}$° C.$^{-1}$. The polymer composition may have a coefficient of linear thermal expansion, in a direction perpendicular to the direction of injection, from about 60×10$^{-6}$° C.$^{-1}$ to about 100×10$^{-6}$° C.$^{-1}$, for example, from about 60×10$^{-6}$° C.$^{-1}$ to about 90×10$^{-6}$° C.$^{-1}$, or from about 60×10$^{-6}$° C.$^{-1}$ to about 80×10$^{-6}$° C.$^{-1}$, or from about 70×10$^{-6}$° C.$^{-1}$ to about 100×10$^{-6}$° C.$^{-1}$, or from about 80×10$^{-6}$° C.$^{-1}$ to about 100×10$^{-6}$° C.$^{-1}$.

The polymer composition may have an average coefficient of linear thermal expansion of no less than about 60×10$^{-6}$° C.$^{-1}$, for example, no less than about 65×10$^{-6}$° C.$^{-1}$, or no less than about 70×10$^{-6}$° C.$^{-1}$, or no less than about 75×10$^{-6}$° C.$^{-1}$, or no less than about 80×10$^{-6}$° C.$^{-1}$, or no less than about 85×10$^{-6}$° C.$^{-1}$, or no less than about 90×10$^{-6}$° C.$^{-1}$.

The polymer composition may have an average coefficient of linear thermal expansion of no greater than about 100×10$^{-6}$° C.$^{-1}$, for example, no greater than about 95×10$^{-6}$° C.$^{-1}$, or no greater than about 90×10$^{-6}$° C.$^{-1}$, or no greater than about 85×10$^{-6}$° C.$^{-1}$, or no greater than about 80×10$^{-6}$° C.$^{-1}$, or no greater than about 75×10$^{-6}$° C.$^{-1}$, or no greater than about 70×10$^{-6}$° C.$^{-1}$. The polymer composition may have an average coefficient of linear thermal expansion from about 60×10$^{-6}$° C.$^{-1}$ to about 100×10$^{-6}$° C.$^{-1}$, for example, from about 60×10$^{-6}$° C.$^{-1}$ to about 90×10$^{-6}$° C.$^{-1}$, or from about 60×10$^{-6}$° C.$^{-1}$ to about 80×10$^{-6}$° C.$^{-1}$, or from about 70×10$^{-6}$° C.$^{-1}$ to about 100×10$^{-6}$° C.$^{-1}$, or from about 80×10$^{-6}$° C.$^{-1}$ to about 100×10$^{-6}$° C.$^{-1}$.

The coefficient of linear thermal expansion of a sample plate of the polymer composition may be determined in the directions parallel and perpendicular to the direction of injection under the effect of an increase in temperature by measuring and plotting the expansion of the plate as a function of temperature.

The "polymer composition that is identical except that it does not comprise the talc particulate of the present invention" may, for example, be a polymer composition in which the talc particulate of the present invention has been removed and not replaced by another talc particulate. Alternatively, the talc particulate of the present invention may have been removed and replaced with a talc particulate not within the present invention, for example a commercial talc particulate such as Luzenac HAR T84 talc®. Luzenac HAIR T84 talc® has a $d_{50sedi}$ of about 1.9 μm, a $d_{95sedi}$ of about 10.5 μm, a $d_{50laser}$ of about 10.5 μm, a $d_{95laser}$ of about 32.1 μm, a BET surface area of about 19.4 $m^2/g$, about 130 TOT layers, a shape factor of about 123 and a DI(TOT) of about 95.

Method for Making the Polymer Composition

The polymer composition may be prepared by combining a polymer or polymer precursors with the talc particulate of the present invention and any other optional components. Where the talc particulate (and any other optional components) are combined with polymer precursors, the resulting combination of the polymer precursors, talc particulate (and other optional components) may be cured.

The polymer composition can be prepared by mixing of the components thereof (except the talc particulate) intimately together. The talc particulate may then be suitably blended, e.g., dry blended, with the mixture of components and any desired additional components, before processing to form a final polymer composite or article.

The polymer composition may, for example, be in accordance with any embodiment disclosed herein.

Preparation of the polymer compositions of the present invention can be accomplished by any suitable mixing method known in the art, as will be readily apparent to one of ordinary skill in the art. Such methods include, for example, dry blending of the individual components or precursors thereof and subsequent processing in a conventional manner. Certain of the ingredients can, if desired, be pre-mixed before addition to the compounding mixture.

In the case of thermoplastic polymer compositions, such processing may comprise melt mixing, either directly in an extruder for making an article from the composition, or pre-mixing in a separate mixing apparatus. Dry blends of the individual components can alternatively be directly injection moulded without pre-melt mixing.

The polymer composition can be prepared by mixing of the components thereof intimately together. The talc particulate may then be suitably dry blended with the polymer and any desired additional components, before processing as described above.

Other filler compounds, may be added and blended in at the mixing stage.

For the preparation of cross-linked or cured polymer compositions, the blend of uncured components or their precursors, and, if desired, the talc particulate and any desired non-talc component(s), will be contacted under suitable conditions of heat, pressure and/or light with an effective amount of any suitable cross-linking agent or curing system, according to the nature and amount of the polymer used, in order to cross-link and/or cure the polymer.

For the preparation of polymer compositions where the talc particulate and any desired other component(s) are present in situ at the time of polymerisation, the blend of monomer(s) and any desired other polymer precursors, talc particulate and any other component(s) will be contacted under suitable conditions of heat, pressure and/or light, according to the nature and amount of the monomer(s) used, in order to polymerise the monomer(s) with the talc particulate and any other component(s) in situ.

In certain embodiments, the talc particulate is dispersed with agitation into a mixture comprising polymer (for example, polypropylene) and optionally a curing agent. The mixture may further comprise a mould release agent.

The resulting dispersion can be degassed to remove entrained air. The resulting dispersion can then be poured into a suitable mould and cured. Suitable curing temperatures range from 20-200° C., for example 20-120° C., or, for example, 60-90° C.

The starting polymer mixture can further comprise a pre-polymer (for example, propylene monomer). The pre-polymer may or may not correspond to the starting polymer.

The viscosity of the starting polymer or polymer/monomer solution, amount of curing agent, release agent and talc particulate can be varied according to the requirements of the final cured product. Generally, the greater the amount of talc particulate added, the higher the viscosity of the dispersion. Dispersant agents can be added to reduce the viscosity of the dispersion. Alternatively, the amount of polymer in the starting solution can be reduced.

Suitable curing agents will be readily apparent to one of ordinary skill in the art, and include organic peroxides, hydroperoxides and azo compounds. Examples of peroxide and hydroperoxide curing agents include dimethyl dibutylperoxyhexane, benzyl peroxide, dicumyl peroxide, methyl ethyl ketone peroxide, lauryl peroxide, cyclohexanone peroxide, t-butyl perbenzoate, t-butyl hydroperoxide, t-butyl benzene hydroperoxide, cumene hydroperoxide and t-butyl peroctoate.

The compounded compositions may further comprise additional components, such as slip aids (for example Erucamide), process aids (for example Polybatch® AMF-705), mould release agents and antioxidants.

Suitable mould release agents will be readily apparent to one of ordinary skill in the art, and include fatty acids, and zinc, calcium, magnesium and lithium salts of fatty acids and organic phosphate esters. Specific examples are stearic acid, zinc stearate, calcium stearate, magnesium stearate, lithium stearate calcium oleate, zinc palmitate. Typically, slip and process aids, and mould release agents are added in an amount less than about 5 wt. % based on the weight of the masterbatch. Polymer articles may then be extruded, compression moulded or injected moulded using conventional techniques known in the art, as will be readily apparent to one of ordinary skill in the art. Thus, as described below, the present invention is also directed to articles formed from the polymer compositions of the present invention.

In certain embodiments, the polymer composition comprises a colorant which, if present, will be added during compound of the polymer composition. The colorant may be added in the form of a masterbatch. Suitable colours are many and various.

In certain embodiments, talc particulate is added to a twin-screw extruder to which unfilled polymer is being fed and made molten. The talc particulate is fed into the extruder through a hopper, for example, via gravimetric feeding, and uniformly blends with the polymer. The mixture emerges from the extruder and may be cooled. Then, for example, the mixture can be further compression moulded or injection moulded into useful shapes.

The methods described above may include compounding and extrusion. Compounding may be carried out using a twin screw compounder, for example, a Clextral BC 21 double screw extruder or a Leistritz ZSE 18 double screw extruder or Baker Perkins 25 mm twin screw compounder. The polymer, talc particulate and optional additional components may be premixed and fed from a single hopper. The resulting melt may be cooled, for example, in a water bath, and then pelletized. Test pieces, e.g., Charpy bars or tensile dumbbells, may be injection moulded or compression moulded or cast or blown into film.

The screw temperature may be between about 100° C. and about 300° C., for example, between about 150° C. and about 280° C., for example, between about 180° C. and about 250° C., or between about 200 and 230° C.

Screw speed may be between about 100 and 1200 rpm, for example, between about 100 and 1000 rpm, for example, between about 200 and 800 rpm, for example, between about 250 and 650 rpm, for example, between about 200 and 400 rpm, or between about 500 and 700 rpm. In certain embodiments, screw speed is about 300 rpm. In other embodiments, screw speed is about 600 rpm.

Suitable injection molding apparatus includes, for example, a Billion 50T Proxima press. The polymer composition may be dried prior to molding. Drying may be carried out at any suitable temperature, for example, about 60° C., for a suitable period of time, for example, between about 1 hours and 20 hours, for example, between about 2 and 18 hours, or between about 1 and 3 hours, or between about 4 and 8 hours, or between about 12 and 18 hours. The temperature during drying may be kept constant or varied. In certain embodiments, the temperature during drying is between about 70 and 120° C., for example, between about 80 and 100° C., for example, about 90° C.

Molding is generally conducted at a temperature at which the polymer composition is flowable. For example, the molding temperature may be between about 100 and 300° C., for example, between about 200 and 300° C., or between about 240 and about 280° C. Following molding the molded piece will be allowed to cool and set.

Other suitable processing techniques include gas-assisted injection molding, calendaring, vacuum forming, thermoforming, blow-molding, drawing, spinning, film forming, laminating or any combination thereof. Any suitable apparatus may be used, as will be apparent to one of ordinary skill in the art.

The polymer composition can be processed to form, or to be incorporated in, articles of commerce in any suitable way, as described herein. The articles which may be formed from the polymer composition are many and various. Examples include automotive body parts and panels, for example, a bonnet (hood), wing piece, wing-mirror casing, door (front and/or rear), tail gate and bumper (front and/or rear).

Uses of the Talc Particulate

The talc particulate of the present invention may, for example, be used in polymer compositions. For example, the talc particulate may be used to increase the flexural modulus and/or the impact strength (e.g. Charpy impact or drop impact strength as described above) of a polymer composition into which it is incorporated. The polymer composition may, for example, be in accordance with any embodiment described herein.

The polymer composition can be processed to form, or to be incorporated in, articles of commerce in any suitable way, as described herein. The articles which may be formed from the polymer composition are many and various. Examples include automotive body parts and panels, for example, a bonnet (hood), wing piece, wing-mirror casing, door (front and/or rear), tail gate and bumper (front and/or rear).

The following numbered paragraphs define particular embodiments of the present invention:

1. A talc particulate having one or more of the following:
   (a) a coherent scattering domain (CSD c*) equal to or less than about 1150 Angstroms;
   (b) equal to or less than about 120 tetrahedral-octahedral-tetrahedral (TOT) layers;
   (c) a delamination index according to TOT layers (DI (TOT)) equal to or greater than about 103;
   (d) a shape factor equal to or greater than about 70;
   (e) a $d_{95laser}$ equal to or less than about 25.0 μm;
   (f) a $d_{95sedi}$ equal to or less than about 10.0 μm;
   (g) a lamellarity index equal to or greater than about 2.5;
   (h) a BET surface area equal to or greater than about 15 $m^2/g$;
   (i) an oil absorption equal to or greater than about 65 mL/100 g;
   (j) a contact angle equal to or less than about 43°.
2. The talc particulate of paragraph 1, having two, three, four, five, six, seven, eight, nine or ten of features (a) to (j).
3. The talc particulate of paragraph 1 or 2, having a CSD c* equal to or less than about 1150 Angstroms.
4. The talc particulate of any preceding paragraph, having a CSD c* equal to or less than about 1050 Angstroms.
5. The talc particulate of any preceding paragraph, having a CSD c* equal to or greater than about 750 Angstroms.
6. The talc particulate of any preceding paragraph, having equal to or less than about 120 TOT layers.
7. The talc particulate of any preceding paragraph, having equal to or less than about 110 TOT layers.
8. The talc particulate of any preceding paragraph, having equal to or greater than about 50 TOT layers.
9. The talc particulate of any preceding paragraph, having a DI(TOT) equal to or greater than about 103.
10. The talc particulate of any preceding paragraph, having a DI(TOT) equal to or greater than about 120.
11. The talc particulate of any preceding paragraph, having a DI(TOT) equal to or less than about 200.
12. The talc particulate of any preceding paragraph, having a shape factor equal to or greater than about 70.
13. The talc particulate of any preceding paragraph, having a shape factor equal to or greater than about 100.
14. The talc particulate of any preceding paragraph, having a shape factor equal to or less than about 200.
15. The talc particulate of any preceding paragraph, having a $d_{95laser}$ equal to or less than about 25.0 μm.
16. The talc particulate of any preceding paragraph, having a $d_{95laser}$ equal to or less than about 20.0 μm.
17. The talc particulate of any preceding paragraph, having a $d_{95laser}$ equal to or greater than about 7.0 μm.
18. The talc particulate of any preceding paragraph, having a $d_{95sedi}$ equal to or less than about 10.0 μm.
19. The talc particulate of any preceding paragraph, having a $d_{95sedi}$ equal to or less than about 6.0 $d_{95sedi}$ μm.
20. The talc particulate of any preceding paragraph, having a $d_{95sedi}$ equal to or less than about 5.0 μm.
21. The talc particulate of any preceding paragraph, having a $d_{50laser}$ equal to or less than about 12.0 μm.
22. The talc particulate of any preceding paragraph, having a $d_{50laser}$ equal to or less than about 8.0 μm.
23. The talc particulate of any preceding paragraph, having a $d_{50laser}$ equal to or greater than about 2.0 μm.
24. The talc particulate of any preceding paragraph, having a $d_{50laser}$ equal to or greater than about 4.0 μm.
25. The talc particulate of any preceding paragraph, having a $d_{50sedi}$ equal to or less than about 5.0 μm.
26. The talc particulate of any preceding paragraph, having a $d_{50sedi}$ equal to or less than about 3.0 μm.

27. The talc particulate of any preceding paragraph, having a $d_{50sedi}$ equal to or less than about 2.5 μm.
28. The talc particulate of any preceding paragraph, having a $d_{50sedi}$ equal to or greater than about 0.5 μm.
29. The talc particulate of any preceding paragraph, having a $d_{95sedi}$ equal to or greater than about 1.0 μm.
30. The talc particulate of any preceding paragraph, having a $d_{95sedi}$ equal to or greater than about 2.5 μm.
31. The talc particulate of any preceding paragraph, having a lamellarity index equal to or greater than about 2.5.
32. The talc particulate of any preceding paragraph, having a lamellarity index equal to or greater than about 2.8.
33. The talc particulate of any preceding paragraph, having a lamellarity index equal to or less than about 6.0.
34. The talc particulate of any preceding paragraph, having a BET surface area equal to or greater than about 15 $m^2/g$.
35. The talc particulate of any preceding paragraph, having a BET surface area equal to or greater than about 17 $m^2/g$.
36. The talc particulate of any preceding paragraph, having a BET surface area equal to or less than about 30 $m^2/g$.
37. The talc particulate of any preceding paragraph, having an oil absorption equal to or greater than about 65 mL/100 g.
38. The talc particulate of any preceding paragraph, having an oil absorption equal to or greater than about 68 mL/100 g.
39. The talc particulate of any preceding paragraph, having an oil absorption equal to or less than about 100 mL/100 g.
40. The talc particulate of any preceding paragraph, having a contact angle equal to or less than about 43°.
41. The talc particulate of any preceding paragraph, having a contact angle equal to or less than about 40°.
42. The talc particulate of any preceding paragraph, having a contact angle equal to or greater than about 33°.
43. A polymer composition comprising a talc particulate of any of paragraphs 1 to 42.
44. The polymer composition of paragraph 43, wherein the polymer is selected from polypropylene, polyethylene, a propylene-ethylene copolymer, or combinations thereof.
45. The polymer composition of paragraph 43 or 44, wherein the polymer is polypropylene.
46. The polymer composition of any of paragraphs 43 to 45, wherein the talc particulate is present in the polymer composition in an amount equal to or greater than about 1 wt %.
47. The polymer composition of any of paragraphs 43 to 46, wherein the talc particulate is present in the polymer composition in an amount equal to or greater than about 10 wt %.
48. The polymer composition of any of paragraphs 43 to 47, wherein the talc particulate is present in the polymer composition in an amount equal to or less than about 70 wt %.
49. The polymer composition of any of paragraphs 43 to 48, wherein the talc particulate is present in the polymer composition in an amount equal to or less than about 30 wt %.
50. The polymer composition of any of paragraphs 43 to 49, wherein the polymer composition has a flexural modulus that is at least about 1.0% greater than the flexural modulus of a polymer composition that is identical except that it does not comprise the talc particulate of any of paragraphs 1 to 42.
51. The polymer composition of any of paragraphs 43 to 50, wherein the polymer composition has a flexural modulus that is at least about 2.0% greater than the flexural modulus of a polymer composition that is identical except that it does not comprise the talc particulate of any of paragraphs 1 to 42.
52. The polymer composition of any of paragraphs 43 to 51, wherein the polymer composition has a flexural modulus that is up to about 50.0% greater than the flexural modulus of a polymer composition that is identical except that it does not comprise the talc particulate of any of paragraphs 1 to 42.
53. The polymer composition of any of paragraphs 43 to 52, wherein the polymer composition has a flexural modulus that is up to about 30.0% greater than the flexural modulus of a polymer composition that is identical except that it does not comprise the talc particulate of any of paragraphs 1 to 42.
54. The polymer composition of any of paragraphs 42 to 53, wherein the polymer composition has an impact strength that is at least about 1.0% greater than the impact strength of a polymer composition that is identical except that it does not comprise the talc particulate of any of paragraphs 1 to 42.
55. The polymer composition of any of paragraphs 42 to 54, wherein the polymer composition has an impact strength that is at least about 5.0% greater than the impact strength of a polymer composition that is identical except that it does not comprise the talc particulate of any of paragraphs 1 to 42.
56. The polymer composition of any of paragraphs 42 to 55, wherein the polymer composition has an impact strength that is up to about 50.0% greater than the impact strength of a polymer composition that is identical except that it does not comprise the talc particulate of any of paragraphs 1 to 42.
57. The polymer composition of any of paragraphs 42 to 56, wherein the polymer composition has an impact strength that is up to about 30.0% greater than the impact strength of a polymer composition that is identical except that it does not comprise the talc particulate of any of paragraphs 1 to 42.
58. A method for making the talc particulate of any of paragraphs 1 to 42, the method comprising classifying a feed talc material to remove a portion of the largest particles in the feed talc material, wherein the feed talc material has one or more of the following:
(a) a lamellarity index equal to or greater than about 2.5;
(b) a $d_{95sedi}$ equal to or less than about 15.0 μm;
(c) a $d_{95laser}$ equal to or less than about 40.0 μm;
(d) a $d_{50sedi}$ equal to or less than about 5.0 μm;
(e) a $d_{50laser}$ equal to or less than about 15.0 μm;
(f) a shape factor equal to or greater than about 40;
(g) a BET surface area equal to or greater than about 10 $m^2/g$;
(h) a DI(TOT) equal to or less than about 102;
(i) equal to or greater than about 110 TOT layers.
59. The method of paragraph 58, wherein the classification takes place by air classification.
60. The method of paragraph 58 or 59, wherein the feed talc material has a lamellarity index ranging from about 2.8 to about 10.0.
61. The method of any of paragraphs 58 to 60, wherein the feed talc material has a $d_{95sedi}$ ranging from about 5.0 μm to about 15.0 μm.
62. The method of any of paragraphs 58 to 61, wherein the feed talc material has a $d_{95laser}$ ranging from about 20.0 μm to about 40.0 μm.

63. The method of any of paragraphs 58 to 62, wherein the feed talc material has a $d_{50sedi}$ ranging from about 0.5 μm to about 5.0 μm.

64. The method of any of paragraphs 58 to 63, wherein the feed talc material has a shape factor ranging from about 40 to about 150.

65. The method of any of paragraphs 58 to 64, wherein the feed talc material has a BET surface area ranging from about 10 $m^2/g$ to about 30 $m^2/g$.

66. The method of any of paragraphs 58 to 65, wherein the method comprises pulverizing the feed talc material prior to the classification.

67. A method for making a polymer composition of any of paragraphs 43 to 57, the method comprising combining the polymer or polymer precursors with the talc particulate of any of paragraphs 1 to 42.

68. The method of paragraph 67, wherein the method comprises combining the polymer precursors with the talc particulate and curing the resulting composition.

69. Use of a talc particulate of any of paragraphs 1 to 42 to increase the flexural modulus of a polymer composition into which it is incorporated.

70. The use of paragraph 69, wherein the polymer composition is in accordance with any of paragraphs 43 to 57.

71. Use of a talc particulate of any of paragraphs 1 to 42 to increase the impact strength of a polymer composition into which it is incorporated.

72. The use of paragraph 71, wherein the polymer composition is in accordance with any of paragraphs 43 to 57.

EXAMPLES

Example 1—Production of Talc Particulate of the Invention

An air classifier (BORA 50 SD) was used to separate a high aspect ratio (HAR) feed talc material (Feed Talc Material A) into 3 fractions. Firstly, either the finest 10 wt % or 20 wt % of Feed Talc Material A were separated to make Inventive Talc Particulate A and Inventive Talc Particulate B respectively. The remaining coarse fraction after the finest 10% of particles were removed from Feed Talc Material A was then itself separated into fine and coarse fractions (By-Product A and By-Product B respectively) or the remaining coarse fraction after the finest 20% of particles were removed from Feed Talc Material A was then itself separated into fine and coarse fractions (By-Product C is the fine fraction) by removing the finest 60-75 wt % of particles from the feed.

The system operating parameters are shown in Table 1 below.

TABLE 1

| System Operating Parameters | Classification #1 | Classification #2 | Classification #3 | Classification #4 |
|---|---|---|---|---|
| Feed Material | Feed Talc Material A | Coarse fraction remaining after classification #1 | Feed Talc Material A | Coarse fraction remaining after classification #3 |
| NEA speed (rpm) | 7700 | 4000 | 5800 | 3650 |
| Airflow (m3/h) | 1400 | 1400 | 1400 | 1400 |
| Secondary air flow (m3/h) | 158 | 200 | 200 | 200 |
| Feed rate (kg/h) | 174 | 228 | 212 | 286 |
| Feed concentration (kg/m3) | 0.12 | 0.16 | 0.15 | 0.20 |
| Feed material (kg) | 475.4 | 109.9 | 289.3 | 184.0 |
| Fines fraction (kg) | 54.4 | 81.7 | 95.6 | 131.9 |
| Coarse fraction (kg) | 421 | 28.2 | 193.7 | 52.1 |
| Fines yield (%) | 11.4 | 74.3 | 33.0 | 71.7 |
| Overall final product yield (%) | — | 65.8 | — | 48.0 |
| Production (kg/h) (fines) | 19.8 | 169 | 70.0 | 205 |
| Trial duration (min) | 164 | 29 | 82 | 39 |
| Classification efficiency (%) | 32 | 82 | 54.8 | 77.3 |
| Blower inlet static pressure (daPa) | 2350 | 1306 | 1860 | 1217 |
| NEA ΔP (daPa) | 2043 | 1113 | 1679 | 1006 |
| Blower absorbed power (kW)* | 27.9 | 13.7 | 20.7 | 12.6 |
| Classifier absorbed power (kW) | 3.37 | 0.57 | 3.07 | 0.48 |

Example 2—Analysis of Talc Materials of Example 1

The particle size distribution, lamellarity index, and BET surface area of the talc materials described in Example 1 were analyzed by the laser and sedimentation techniques described herein. This was also compared to some commercially available talc materials (Comparative Talc A and Comparative Talc B).

The results are shown in Table 2 below.

TABLE 2

| | Feed Talc Material A | Inventive Talc Particulate A | Inventive Talc Particulate B | By-Product A | By-Product B | By-Product C | Comparative Talc A | Comparative Talc B |
|---|---|---|---|---|---|---|---|---|
| Sedigraph | | | | | | | | |
| $d_{95}$ (μm) | 9.9 | 2. | 3.2 | 6.2 | 13.5 | 7.5 | 5.4 | 11.2 |
| $d_{75}$ (μm) | 4.2 | 1.3 | 1.8 | 3.3 | 7.8 | 4.1 | 3.2 | 6.3 |

TABLE 2-continued

| | Feed Talc Material A | Inventive Talc Particulate A | Inventive Talc Particulate B | By-Product A | By-Product B | By-Product C | Comparative Talc A | Comparative Talc B |
|---|---|---|---|---|---|---|---|---|
| $d_{50}$ (μm) | 2.2 | 0.7 | 1.0 | 2.0 | 5.2 | 2.6 | 2.1 | 3.8 |
| $d_{25}$ (μm) | 0.9 | 0.4 | 0.5 | 0.8 | 2.4 | 1.1 | 1.3 | 2.1 |
| | | | | Laser | | | | |
| $d_{95}$ (μm) | 32.6 | 7.2 | 10.3 | 20.1 | 34.6 | 21.8 | 12.0 | 21.2 |
| $d_{75}$ (μm) | 16.9 | 4.7 | 6.6 | 12.4 | 22.4 | 13.9 | 7.8 | 12.7 |
| $d_{50}$ (μm) | 10.4 | 3.4 | 4.7 | 8.5 | 15.7 | 9.6 | 5.6 | 8.4 |
| $d_{25}$ (μm) | 6.2 | 2.4 | 3.3 | 5.6 | 10.8 | 6.6 | 4.0 | 5.4 |
| L.I. | 3.7 | 3.9 | 3.7 | 3.3 | 2.0 | 2.7 | 1.7 | 1.2 |
| BET SA ($m^2/g$) | 14.8 | 28.9 | 24.6 | 16.3 | 9.5 | 14.4 | 7.8 | 5.1 |

Example 3—Polymer Composition Comprising Talc Materials of Example 1

The talc materials of Examples 1 and 2 were incorporated into a polymer composition by the following procedure:
Compounds are extruded on a twin screw extruder with 18 mm diameter and L/D 48
15 wt % of talc is introduced in the side feeder 1 (150 rpm)
The polymer was polypropylene (56M 10 Sabic®)
Output: 3 kg/h
Screw speed: 600 rpm
Extruder temperatures: 240° C. (×3 heating zones) then 205° C.

The flexural modulus and Charpy unnotched impact strength of the polymer compositions was determined by the methods described herein (flexural modulus according to ISO norm 178 and Charpy unnotched flatwise and normal impact according to ISO norm 179-1).

The adjusted values are obtained firstly after having checked the real loading by ashing the compounds and secondly by re-calculating the flexural modulus at the same loading (here 15 wt %) and considering the flexural modulus of the neat polymer. Flexural modulus versus talc loading being linear.

The results are shown in Table 3 below.

The system operating parameters for the classification are shown in the Table below.

| System Operating Parameters | Classification #1 to obtain Inventive Talc Particulate C | Classification #2 to obtain Inventive Talc Particulate D |
|---|---|---|
| Feed Material | Feed Talc Material B | Feed Talc Material B |
| NEA speed (rpm) | 4700 | 4600 |
| Airflow (m3/h) | 1400 | 1400 |
| Secondary air flow (m3/h) | 200 | 200 |
| Feed rate (kg/h) | 210 | 198 |
| Feed concentration (kg/m3) | 0.15 | 0.14 |
| Feed material (kg) | 906 | 456 |
| Fines fraction (kg) | 482 | 263.6 |
| Coarse fraction (kg) | 424 | 192.4 |
| Fines yield (%) | 53.2 | 57.8 |
| Production (kg/h) (fines) | 112 | 114 |
| Trial duration (min) | 259 | 138 |
| Classification efficiency (%) | 68.8 | 71.3 |
| Blower inlet static pressure (daPa) | 1406 | 1314 |
| NEA ΔP (daPa) | 1226 | 1314 |
| Blower absorbed power (kW)* | 14.3 | 13.2 |
| Classifier absorbed power (kW) | 1.21 | 0.75 |

TABLE 3

| | Feed Talc Material A | Inventive Talc Particulate A | Inventive Talc Particulate B | By-Product A | By-Product B | By-Product C | Comparative Talc A | Comparative Talc B |
|---|---|---|---|---|---|---|---|---|
| | | | | Flexural Modulus (MPa) | | | | |
| 0-N measured | 2109 | 2325 | 2236 | 2261 | 2047 | 2141 | 1957 | 1903 |
| δ (standard deviation) | 5.95 | 21.42 | 13.36 | 8.25 | 19.61 | 13.33 | 17.18 | 17.99 |
| 0-5 N adjusted @ 20% | 2154 | 2333 | 2236 | 2261 | 2040 | 2172 | 1964 | 1903 |
| δ (standard deviation) | 6.2 | 21.57 | 13.36 | 8.25 | 19.48 | 13.7 | 17.29 | 17.99 |
| | | | Charpy Unnotched Impact Strength @ −20° C. - 7.5 kJ (kJ/$m^2$) | | | | | |
| Impact Strength | 36.0 | 57.4 | 56.1 | 43.7 | 28.7 | 41.2 | 67.1 | 48.8 |
| δ (standard deviation) | 2.1 | 5.8 | 4.2 | 2.9 | 2.7 | 1.8 | 6.4 | 2.2 |

It was surprisingly found that the inventive talc particulates improved both the flexural modulus and impact strength of the polymer compositions.

Example 4—Preparation of Talc Particulate of the Invention

Feed Talc Material B was separated into fractions by air classification (BORA 50 SD).

This produced Inventive Talc Particulate C and Inventive Talc Particulate 0.

The remaining coarse fraction after Inventive Talc Particulate C or D was removed was then dry milled to reduce its particle size distribution until the one from the fine fraction is obtained.

The system operating parameters for the dry milling are shown in the Table below.

| System Operating Parameters | Dry milling to obtain by-product D | Dry milling to obtain by-product E |
|---|---|---|
| Feed Material | Coarse fraction from classification #1 | Coarse fraction from classification #2 |
| NEA speed (rpm) | 4300 | 3975 |
| Airflow (m3/h) | 1100 | 1100 |
| Secondary air flow (m3/h) | 100 | 100 |
| Feed rate (kg/h) | 38 | 42 |
| Pamir discharge (kg/h) | 147 | 143 |
| Fines yield (%) | 25.8 | 29.4 |
| Classifier efficiency (%) | 32.3 | 36.5 |
| Pamir speed (rpm) | 400 | 400 |
| Pamir absorbed power (kW) | 5.89 | 5.89 |
| Specific grinding energy (kWh/t) | 155 | 140 |
| Product outlet temperature (° C.) | 64 | 61 |
| Pamir ΔP (daPa) | 170 | 170 |
| Bora ΔP (daPa) | 915 | 883 |
| Fan inlet static pressure (daPa) | 1250 | 1217 |
| Fan absorbed power (kW) | 10.9 | 10.6 |
| Bora absorbed power (kW) | 1.36 | 1.36 |

Example 5—Analysis of the Talc materials of Example 4

A number of particle shape, size and surface properties of the talc materials described in Example 4 were analyzed by the methods described herein. This was also compared to some commercially available talc materials (Comparative Taics A to J).

The results are shown in Tables 4 to 7 below.

TABLE 4

| Talc Material | N(TOT) | CSD c* (Å) | Shape Factor | DI(TOT) | BET Surface Area ($m^2/g$) | Oil Absorption (mL/100 g) | Contact Angle (°) |
|---|---|---|---|---|---|---|---|
| Feed Talc Material B | 114 | 1060 | 116 | 102 | 17 | 64 | 38.3 |
| Inventive Talc Particulate C | 97 | 901 | 125 | 129 | 22 | — | 39.1 |
| Inventive Talc Particulate D | 97 | 903 | 125 | 129 | 20.7 | 70 | 36.8 |
| By-Product D | 104 | 966 | 56 | 54 | 23.7 | — | 44.7 |
| By-Product E | 102 | 955 | 57 | 56 | 22 | 52 | 46 |
| By-Product F | 134 | 1250 | 110 | 82 | 10.2 | 56 | 44.1 |
| Comparative Talc A | 138 | 1291 | — | — | 7.8 | — | — |
| Comparative Talc B | — | — | 23 | — | — | — | 47.2 |
| Comparative Talc C | 150 | 1396 | — | — | 23.3 | — | — |
| Comparative Talc D | 130 | 1212 | 123 | 95 | 17 | — | 39.6 |
| Comparative Talc E | 143 | 1335 | — | — | 18.3 | — | — |
| Comparative Talc F | 136 | 1335 | — | — | 14.9 | — | — |
| Comparative Talc G | 139 | 1298 | — | — | — | — | — |
| Comparative Talc H | 141 | 1316 | 33 | 52 | 8.5 | — | 47.9 |
| Comparative Talc I | 117 | 1092 | — | — | 11.3 | — | — |
| Comparative Talc J | 81 | 755 | 74 | 91 | 21.4 | — | 31.5 |

TABLE 5

| | Sedigraph | | | |
|---|---|---|---|---|
| Talc Material | $d_{95}$ (μm) | $d_{75}$ (μm) | $d_{50}$ (μm) | $d_{25}$ (μm) |
| Feed Talc Material B | 11.0 | 4.8 | 2.7 | 1.2 |
| Inventive Talc Particulate C | 4.8 | 2.7 | 1.6 | 0.8 |
| Inventive Talc Particulate D | 5.4 | 2.9 | 1.8 | 0.8 |
| By-Product D | 5.3 | 3.2 | 2.1 | 1.0 |
| By-Product E | 6.2 | 3.6 | 2.2 | 1.0 |
| By-Product F | 14.2 | 7.6 | 4.9 | 3.1 |
| Comparative Talc D | 10.5 | — | 1.9 | — |
| Comparative Talc H | 5.8 | 3.0 | 2.0 | 1.2 |
| Comparative Talc J | 6.9 | 2.4 | 1.1 | 0.5 |

TABLE 6

| | Laser | | | |
|---|---|---|---|---|
| Talc Material | $d_{95}$ (μm) | $d_{75}$ (μm) | $d_{50}$ (μm) | $d_{25}$ (μm) |
| Feed Talc Material B | 29.2 | 17.2 | 11.3 | 7.2 |
| Inventive Talc Particulate C | 14.9 | 9.2 | 6.3 | 4.2 |
| Inventive Talc Particulate D | 16.5 | 10.1 | 6.8 | 4.5 |
| By-Product D | 15.4 | 9.5 | 6.5 | 4.4 |
| By-Product E | 17.1 | 11.0 | 7.6 | 5.1 |
| By-Product F | 34.5 | 20.9 | 14.0 | 9.2 |
| Comparative Talc D | 32.1 | — | 10.5 | — |
| Comparative Talc H | 11..5 | 7.6 | 5.4 | 3.8 |
| Comparative Talc J | 23.8 | 11.0 | 6.3 | 3.7 |

TABLE 7

| Talc Material | Lamellarity Index |
|---|---|
| Feed Talc Material B | 3.2 |
| Inventive Talc Particulate C | 2.9 |
| Inventive Talc Particulate D | 2.8 |
| By-Product D | 2.1 |
| By-Product E | 2.4 |
| By-Product F | 1.8 |
| Comparative Talc A | 1.7 |
| Comparative Talc B | 1.2 |
| Comparative Talc C | 5.7 |
| Comparative Talc D | 4.5 |
| Comparative Talc E | 4.5 |
| Comparative Talc F | 3.9 |
| Comparative Talc G | — |
| Comparative Talc H | 1.7 |
| Comparative Talc I | 2.1 |
| Comparative Talc J | 4.7 |

Example 6—Polymer Composition Comprisinq Talc Materials of Example 4

The talc materials of Examples 4 and 5 were incorporated into a polymer composition as follows:

Formulation:
- 79.4 wt % PP copolymer (SABIC® 56M10)
- 20 wt % talc as shown
- 0.6 wt % additives mix (⅓ Irganox® 1010+⅓ Irgafos® 168+⅓ Calcium stearate)

Processing conditions
- Extrusion: twin screw extruder L/D=48 and diameter=18 mm
- Temperature profile: 240° C.x3 on the first 3 heating zones+205° C.x8
- on the 8 following heating zones
- Throughput: 10 kg/h
- Screw speed: 900 rpm
- Talc in side feeder 1
- Injection: 205° C.

Products tested:
- Comparative Talc D
- Inventive Talc Particulate C

Charpy impact strength (KJ/m) (unnotched flatwise and normal impact) may be measured on 80 mm by 10 mm by 4 mm bars according to ISO 179-1 at −20° C. Falling weight index (J) at −21° C. may be measured on 60*60 *3 mm plaques according to EN ISO 6603:2.

The impact strength (e.g. Charpy impact strength) may be recalculated to place it at ISO flexural modulus. This is determined by extruding polymer compositions at different talc loadings using a comparative talc and a talc particulate of the present invention. Flexural modulus and impact strength are then measured for each composition. The curves for flexural modulus versus talc loading are plotted. On the curve flexural modulus vs talc loading for the talc particulate of the present invention, the loading of the talc particulate of the present invention corresponding to the same flexural modulus as the comparative talc at 20% talc loading is calculated. The curve impact strength versus talc loading for the talc particulate of the present invention is then plotted. The impact strength at ISO flexural modulus is the impact strength corresponding to the talc loading that provides the same flexural modulus as the comparative talc at 20% talc loading.

The results are shown in Table 8 below.

TABLE 8

| | ISO norm (method) | Comparative Talc D | Inventive Talc Particulate C | Variation |
|---|---|---|---|---|
| Flexural modulus, (MPa) | 178 | 2838 | 2967 | +4.5% |
| Charpy impact 1FU at −20° C. , (KJ/m$^2$) | 179 | 31.8 | 36.7 | +15.4% |
| At ISO flexural modulus (data re-calculated) | | | | |
| Flexural modulus, (MPa) | 178 | 2838 | 2838 | |
| Charpy impact 1FU at −20° C., (KJ/m$^2$) | 179 | 31.8 | 43.8 | +37.7% |

It was surprisingly found that the inventive talc particulate provides an approximately 5% improvement in flexural modulus and more than 15% improvement in impact strength compared to the comparative talc material.

By recalculating the results to place them at iso flexural modulus, the improvement in impact strength is above 30%.

The decrease of TOT layers and the increase of DI(TOT) in the inventive talc particulate indicate that the product is more lamellar, which has a direct influence on the flexural modulus.

The finer granulometry of the inventive talc particulate is thought to have a strong effect on the improvement of impact strength.

These properties are usually detrimental to one another. The combination of both is therefore surprising.

Example 7—Polymer Composition Comprisinq Talc Materials of Example 4

The talc materials of Examples 4 and 5 were incorporated into a polymer composition as follows:

Formulation:
- 64.4 wt % PP copolymer (Exxon 7075L1)
- talc as shown (20 wt % for Comparative Talc D and 18.4 wt % for Inventive Talc Particulate C)
- 15 wt % Elastomer (DOW XUR 6044-1)
- 0.6 wt % additives mix (⅓ Irganox® 1010+⅓ Irgafos® 168+⅓ Calcium stearate)

Processing conditions
- Extrusion: twin screw extruder L/D=48 and diameter=18 mm
- Temperature profile: 240° C.x3 on the first 3 heating zones+205° C.x8
- on the 8 following heating zones
- Throughput: 7.5 kg/h
- Screw speed: 750 rpm
- Injection: 205° C.

Products tested:
- Comparative Talc D
- Inventive Talc Particulate C

The flexural modulus and falling weight impact strength of the polymer compositions was determined by the following methods:

Flexural modulus according to ISO norm 178
Falling weight impact according to ISO nom 6603-2
Impact speed=4.4 m/s
Weight≥0,31×E*(for speed=4.4 m/s)
Weight in kg
E*=the highest puncture energy to measure U)

The results are shown in Table 9 below.

TABLE 9

| | ISO norm (method) | Comparative Talc D | Inventive Talc Particulate C | Variation |
|---|---|---|---|---|
| Flexural modulus, (MPa) | 178 | 1926 | 1921 | −0.3% |
| Falling Weight Impact at −21° C., Puncture Energy, J | 6603-2 | 18 | 23.9 | +32.8 |

It was surprisingly found that the failing weight impact strength at −21° C. is increased by approximately 30% using the inventive talc particulate compared to the comparative talc material.

This example confirms the positive influence of the inventive talc particulate on the impact strength properties at low temperature.

Example 8—Preparation of Talc Particulate of the Invention

A high aspect ratio (HAR) feed talc material (Feed Talc Material C) was separated into fractions by air classification (BORA 50 SD).

The system operating parameters for the classification are shown in Table 10 below.

TABLE 10

| System Operating Parameters | Classification #3 to obtain Inventive Talc Particulate E |
|---|---|
| Feed Material | Feed Talc Material C |
| NEA speed (rpm) | 4900 |
| Airflow (m3/h) | 1400 |
| Secondary air flow (m3/h) | 200 |
| Feed rate (kg/h) | 170 |
| Fines yield (%) | 31.4 |

This produced Inventive Talc Particulate E.

Example 9—Analysis of the Talc Materials of Example 8

A number of particle shape, size and surface properties of the talc material described in Example 8 were analyzed by the methods described herein. This was also compared to a commercially available talc material (Comparative Talc K).

The results are shown in Tables 11 to 14 below.

TABLE 11

| Talc Material | N(TOT) | CSD c* (Å) | Shape Factor | DI(TOT) | BET Surface Area ($m^2/g$) | Oil Absorption (mL/100 g) | Contact Angle (°) |
|---|---|---|---|---|---|---|---|
| Feed Talc Material C | 145 | 1352 | 128 | 88 | 14.9 | 64 | 38.3 |
| Inventive Talc Particulate E | 118 | 1100 | 121 | 103 | 20.2 | — | — |
| Comparative Talc K | 152 | 1418 | 134 | 88 | 19.2 | — | — |

TABLE 12

| | Sedigraph | | | |
|---|---|---|---|---|
| Talc Material | $d_{95}$ (μm) | $d_{75}$ (μm) | $d_{50}$ (μm) | $d_{25}$ (μm) |
| Feed Talc Material C | 10.6 | 4.8 | 2.5 | 0.9 |
| Inventive Talc Particulate E | 4 | 2.2 | 1.3 | 0.7 |
| Comparative Talc K | 11.8 | 4.3 | 2 | 0.7 |

TABLE 13

| | Laser | | | |
|---|---|---|---|---|
| Talc Material | $d_{95}$ (μm) | $d_{75}$ (μm) | $d_{50}$ (μm) | $d_{25}$ (μm) |
| Feed Talc Material C | 31.3 | 18.0 | 11.7 | 7.4 |
| Inventive Talc Particulate E | 11.2 | 7.1 | 5.1 | 3.5 |
| Comparative Talc K | 37.6 | 19.0 | 11.4 | 6.7 |

TABLE 14

| Talc Material | Lamellarity Index |
|---|---|
| Feed Talc Material C | 3.7 |
| Inventive Talc Particulate E | 2.9 |
| Comparative Talc K | 3.4 |

Example 10—Polymer Compositions Comprising Talc Materials of Examples 8 and 9

The talc materials of Examples 8 and 9 were incorporated into a polymer composition as follows:

Formulation:

- 66.4 wt. % PP (7075 Exxon® batch 169001 131A)
- 15 wt. % Polyester Elastomer Engage® 11547 (Dow®)
- 15 wt. % talc as shown
- 0.6 wt. % additives mix (50% A20, 50% PPC20 additives ⅓ Irganox® 1010+⅓ Irgafos® 168+⅓ Calcium stearate)

Processing conditions

- Extrusion: twin screw extruder L/D=48 and diameter=18 mm
- Temperature profile: 240° C.×3 on the first 3 heating zones+205° C.×8 on the 8 following heating zones
- Throughput: 7.5 kg/h
- Screw speed: 750 rpm
- No vacuum
- Talc in side feeder 1, dosing unit 3
- Elastomer in main feeder, dosing unit 4
- Screw profile 1
- Injection: PPC20 parameters: 205° C.

Products tested:

- Comparative Talc K
- Inventive Talc Particulate E

Charpy impact strength (unnotched flatwise and normal impact), Izod impact strength (notched) (according to ISO 180), unadjusted and adjusted flexural modulus, scratch resistance, coefficient of linear thermal expansion (CLTE), falling weight impact (FWI) resistance, elongation at break and tensile modulus (by tensile testing according to ISO 527) were measured by the methods described herein.

The results are shown in Table 15 below, where "σ" indicates the standard deviation in the measurements in the row above.

TABLE 15

| | Comparative Talc K | Inventive Talc Particulate E |
|---|---|---|
| Unadjusted flexural modulus (MPa) | 1483 | 1558 |
| σ | 15 | 13 |
| Adjusted flexural modulus (MPa) | 1458 | 1541 |
| σ | 15 | 15 |
| Charpy unnotched at −40° C. ($KJ/m^2$) | 82 | 82.0 |
| σ | 5 | 7.0 |
| Charpy notched at −20° C. ($KJ/m^2$) | 4.9 | 5.6 |
| σ | 0.2 | 0.3 |
| Izod notched at 23° C. ($KJ/m^2$) | 36.1 | 41.4 |
| σ | 1.3 | 1.3 |
| Scratch resistance ΔL* | 3.7 | 2.9 |
| σ | 0.2 | 0.20 |
| CLTE parallel ($10^{-6}$(° $C.^{-1}$)) | 72 | 68 |
| CLTE perpendicular ($10^{-6}$(° $C.^{-1}$)) | 78 | 71 |
| CLTE average ($10^{-6}$(° $C.^{-1}$)) | 75 | 71 |
| FWI resistance at −30° C., Puncture Energy (J) | 16.5 | 18.4 |
| σ | 1.3 | 2.1 |
| FWI resistance at −30° C., Ductibility | 0 | 0 |
| σ | 0 | 0 |
| Tensile modulus (MPa) | 1260 | 1382 |
| σ | 60 | 57 |
| Stress at yield (MPa) | 17 | 18 |
| σ | 0.1 | 0.1 |
| Strain at yield (%) | 4.06 | 4 |
| σ | 0 | 0.1 |
| Strain at break (%) | 46.1 | 84 |
| σ | 8.7 | 13 |
| Stress at break (MPa) | 9 | 10 |
| σ | 1.3 | 0.5 |
| Elongation at break (%) | 23.6 | 43.4 |
| σ | 4.6 | 6.6 |

The talc materials of Examples 8 and 9 were also incorporated into a second set of polymer compositions with formulations as defined in Table 16.

TABLE 16

| | PP (%) | Additives (%) | Talc (%) | Elastomer (%) | Total (%) |
|---|---|---|---|---|---|
| Polymer Composition A | 79.4 | 0.6 | 20 | 0 | 100 |
| Polymer Composition B | 74.4 | 0.6 | 20 | 5 | 100 |
| Polymer Composition C | 69.4 | 0.6 | 20 | 10 | 100 |
| Polymer Composition D | 64.4 | 0.6 | 20 | 15 | 100 |
| Polymer Composition E | 59.4 | 0.6 | 20 | 20 | 100 |
| Polymer Composition F | 77.4 | 0.6 | 18 | 0 | 100 |
| Polymer Composition G | 72.4 | 0.6 | 18 | 5 | 100 |
| Polymer Composition H | 67.4 | 0.6 | 18 | 10 | 100 |
| Polymer Composition I | 62.4 | 0.6 | 18 | 15 | 100 |
| Polymer Composition J | 57.4 | 0.6 | 18 | 20 | 100 |

Where:

- PP is: 56M 10 (Sabic®) Batch 159909
- Additives are: 50% A20, 50% PPC20 additives ⅓ Irganox®1010+⅓ Irgafos® 168+⅓ calcium stearate
- Elastomer is: XUR 6044-1 from Dow Chemicals®
- Talc is:
  - Comparative Talc K for Polymer Compositions A to E
  - Inventive Talc Particulate E for Polymer Compositions F to J Polymer compositions A to J were prepared using the following processing conditions:

- Extrusion: twin screw extruder L/D=48 and diameter=18 mm

Temperature profile: 240° C.×3 on the first 3 heating zones+205° C.×8 on the 8 following heating zones
Throughput: 7.5 kg/h
Screw speed: 750 rpm
No vacuum
Talc in side feeder 1, dosing unit 3
Elastomer in main feeder, dosing unit 4
Screw profile 1
Injection: PPC20 parameters: 205° C.

Charpy impact strength (unnotched flatwise), Izod impact strength (notched), flexural modulus, coefficient of linear thermal expansion (CLTE) and falling weight impact (FWI) resistance were measured by the methods described herein.

The results are shown in Tables 17 and 18 below, where "a" indicates the standard deviation in the measurements in the row above.

TABLE 17

| | Polymer Composition A | Polymer Composition B | Polymer Composition C | Polymer Composition D | Polymer Composition E |
|---|---|---|---|---|---|
| Flexural modulus (MPa) | 2520 | 2303 | 2045 | 1768 | 1482 |
| σ | 15 | 15 | 15 | 15 | 5 |
| Charpy unnotched at −20° C. (KJ/m$^2$) | 31.0 | — | — | — | — |
| σ | 3.0 | — | — | — | — |
| Izod notched at 20° C. (KJ/m$^2$) | 4.5 | 6.9 | 20.4 | 34.7 | 43.0 |
| σ | 0.2 | 0.3 | 0.9 | 1.3 | 1.5 |
| CLTE parallel (10$^{-6}$(° C.$^{-1}$)) | 90 | 91 | 78 | 72 | 60 |
| CLTE perpendicular (10$^{-6}$(° C.$^{-1}$)) | 85 | 85 | 80 | 73 | 61 |
| CLTE average (10$^{-6}$(° C.$^{-1}$)) | 88 | 88 | 79 | 73 | 60 |
| FWI resistance at −30° C., Puncture Energy (J) | 2.3 | 9.9 | 12.4 | 18.3 | 24.9 |
| σ | 1 | 1.4 | 0.7 | 0.5 | 0.3 |
| FWI resistance at −30° C., Ductibility | 0 | 0 | 0 | 0.6 | 2.5 |

TABLE 18

| | Polymer Composition F | Polymer Composition G | Polymer Composition H | Polymer Composition I | Polymer Composition J |
|---|---|---|---|---|---|
| Flexural modulus (MPa) | 18.5 | 18.6 | 18.6 | 18.7 | 18.4 |
| σ | 2438 | 2226 | 1957 | 1750 | 1505 |
| Charpy unnotched at −20° C. (KJ/m$^2$) | 38-41 | — | — | — | — |
| σ | 5 | — | — | — | — |
| Izod notched at 20° C. (KJ/m$^2$) | 4.8 | 7.3 | 20.0 | 40.8 | 48.0 |
| σ | 0.3 | 0.2 | 1.6 | 2.0 | 0.8 |
| Hinge observed? | — | All samples | All samples | All samples | All samples |
| Hinge observations | — | — | — | Big hinge | Big hinge |
| CLTE parallel (10$^{-6}$(° C.$^{-1}$)) | 92 | 91 | 95 | 72 | 67 |
| CLTE perpendicular (10$^{-6}$(° C.$^{-1}$)) | 88 | 91 | 86 | 70 | 69 |
| CLTE average (10$^{-6}$(° C.$^{-1}$)) | 90 | 88 | 91(81) | 71 | 68(60) |
| FWI resistance at −30° C., Puncture Energy (J) | 12.4 | 15.3 | 19.6 | 27.3 | 27.4 |
| σ | 1.4 | 1.3 | 0.9 | 1.9 | 0.1 |
| FWI resistance at −30° C., Ductibility | 0 | 0 | 0.2 | 1.2 | 2.5 |

Example 11—Decomposition of Talc Materials

The decomposition of talc materials can be studied using thermogravimetic analysis (TGA) and derivative thermogravimetry (DTG). For example, FIG. 1 shows example curves obtained by TGA and DTG analysis of a talc material and indicates regions of the curve in which moisture and strongly bonded water are released and in which chlorite, dolomite and talc decompose.

Feed Talc Material B was separated into a number of different fractions by air classification (BORA 50 SD) following the method of Example 4, each fraction having a different $d_{95}$ topcut. The different fractions were analysed used TGA and DTG.

Figure 2:
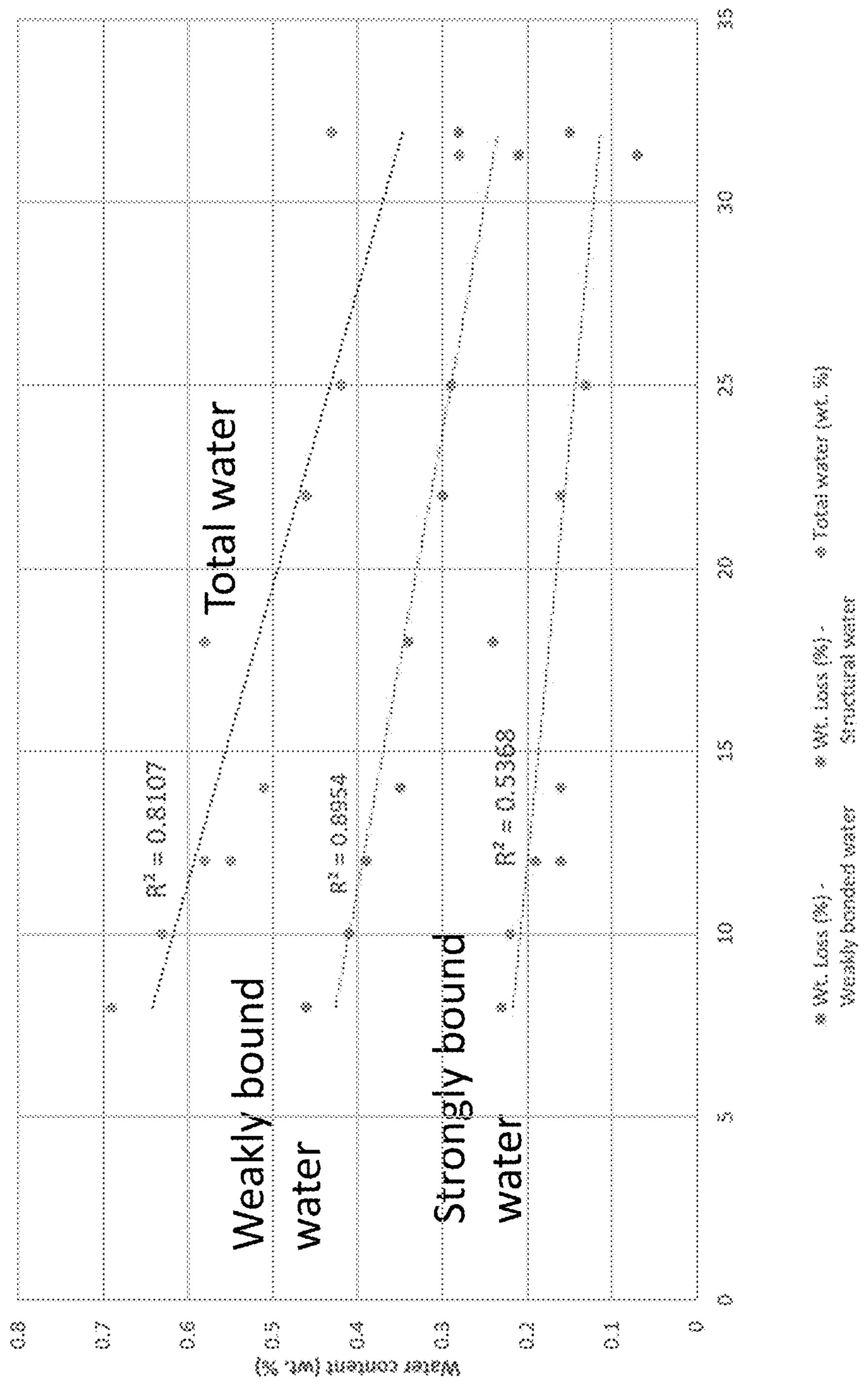
FIG. 2 is a plot of water content as a function of $d_{95}$ topcut for inventive talc particulates.

FIG. 2 shows plots of the water content (including weakly bonded water (i.e. moisture) and strongly bonded water (i.e. structural water)) released during the analysis, measured as a function of the $d_{95}$ value (by laser). It can be seen that the weakly bound water (i.e. moisture) content of the samples increases with decreasing topcut.

Figure 3:
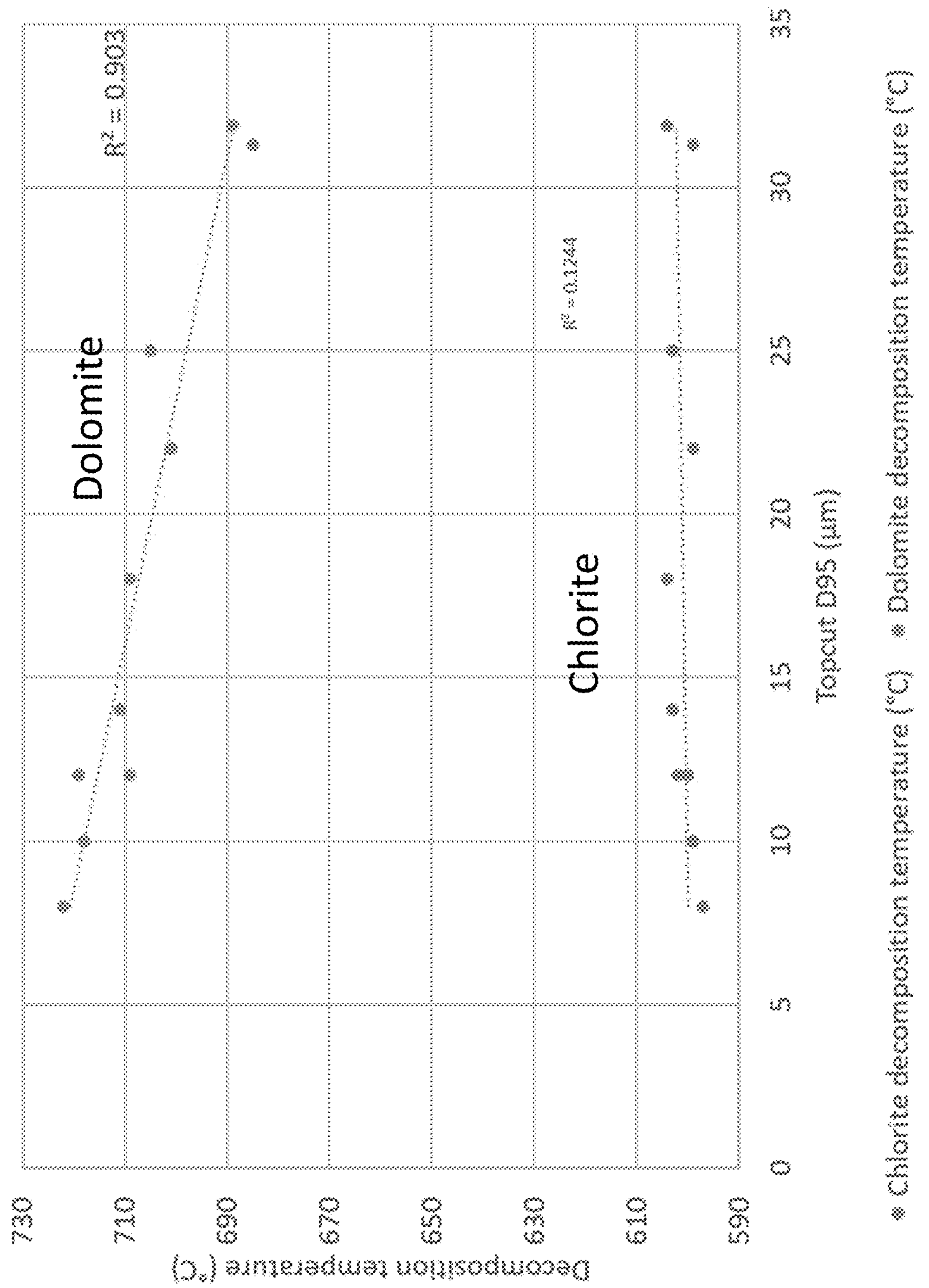
FIG. 3 (*a*) is a plot of dolomite and chlorite decomposition temperature as a function of $d_{95}$ topcut for inventive talc particulates.
Figure 3:
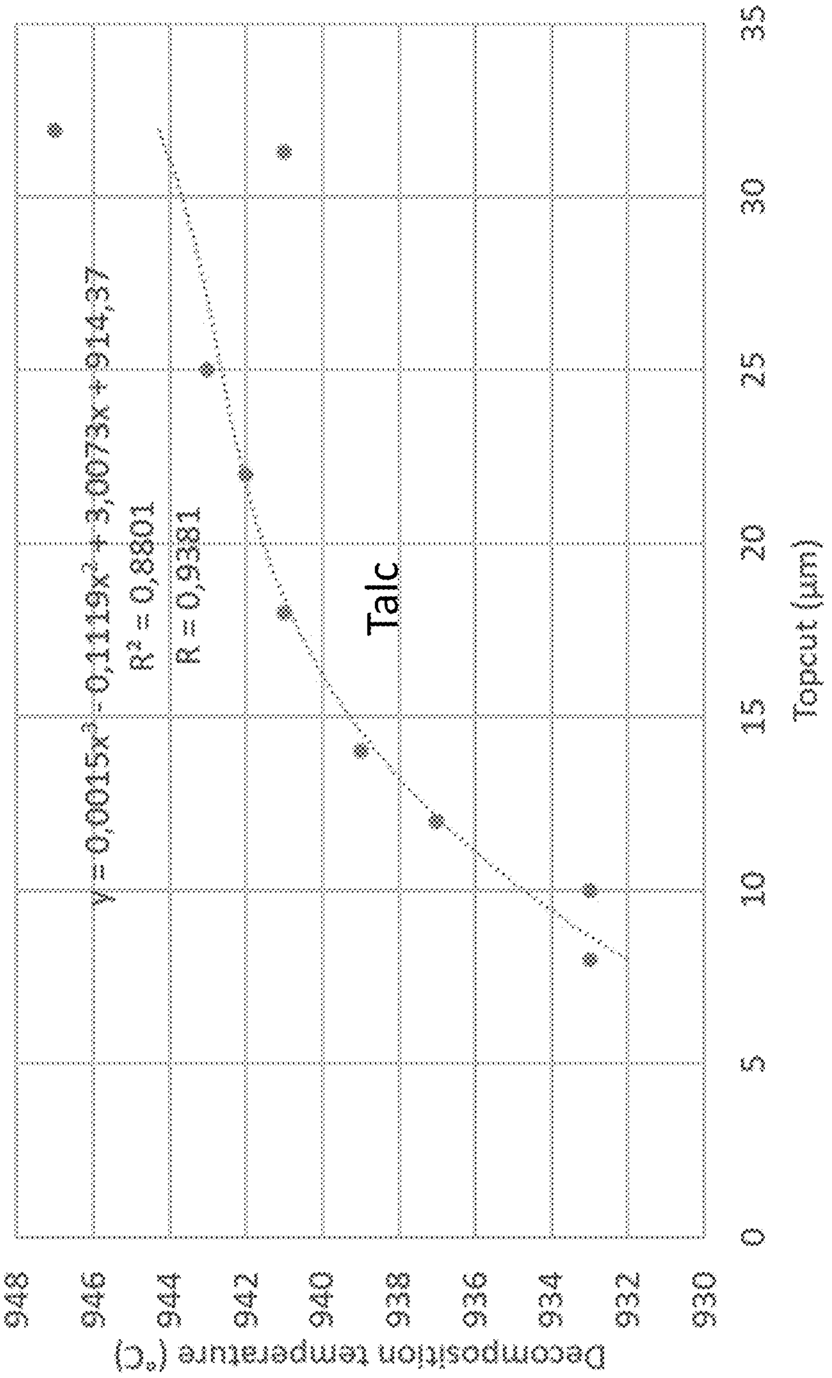

FIG. 3 shows plots of (a) the chlorite and dolomite decompositions temperatures and (b) the talc decomposition temperatures measured as a function of the $d_{95}$ value (by laser). It can be seen that the dolomite decomposition temperature is correlated with the topcut. The chlorite decomposition temperature is not correlated with the topcut. The talc decomposition temperature is correlated with the topcut and, in fact, exhibits a polynomial correlation. In general, the decomposition temperature of the talc decreases with increasing topcut. Without wishing to be bound by theory, this behaviour is attributed to lower crystallinity of lower topcut fractions promoting talc decomposition. As can be seen in FIG. 3 (*b*), the decomposition temperature of talc is reduced by 10° C. by reducing the $d_{95}$ topcut (by laser) from about 35 μm to about 12 μm.

Figure 4:
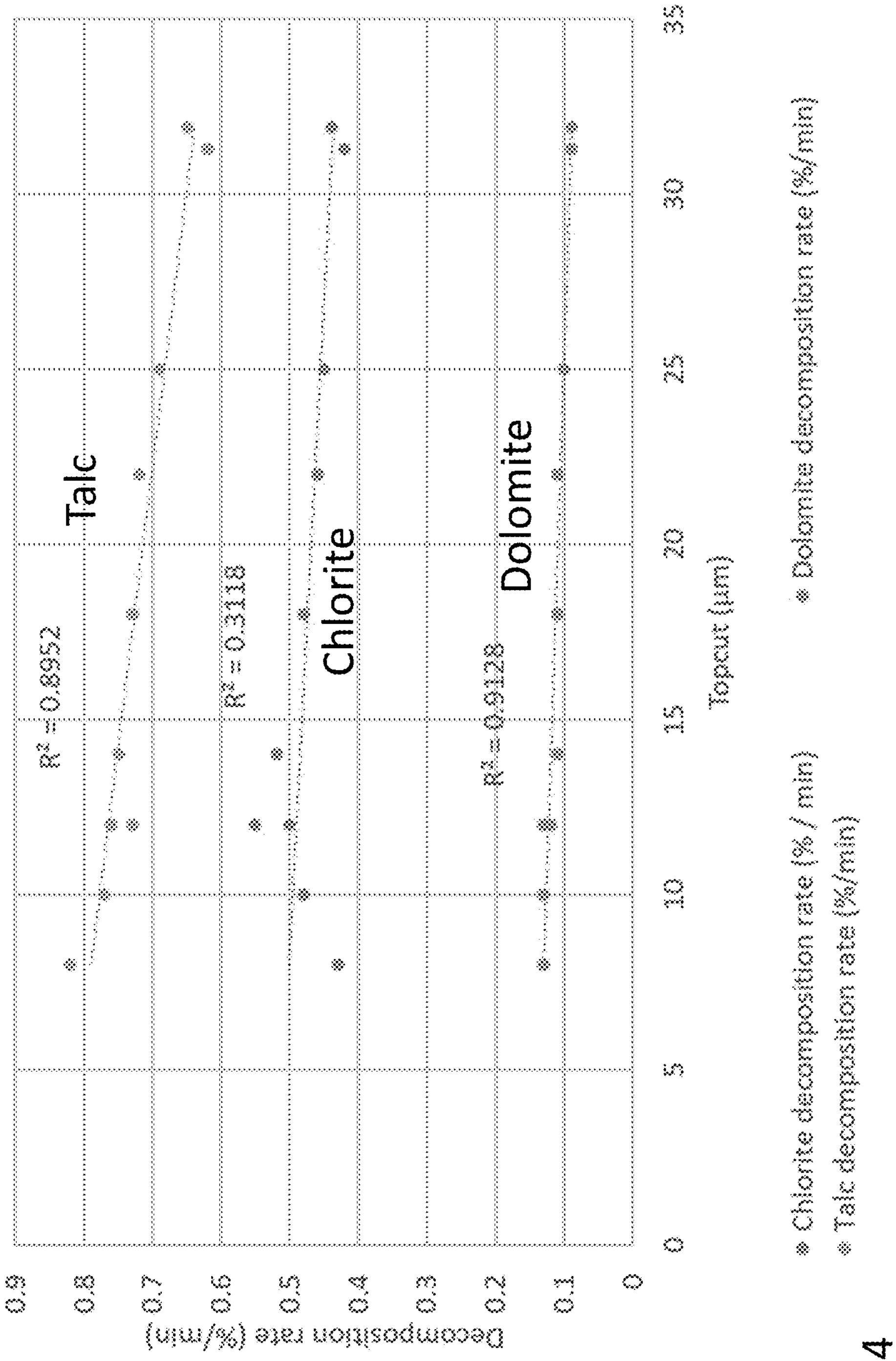
FIG. 4 is a plot of talc, chlorite and dolomite decomposition rate as a function of $d_{95}$ topcut for inventive talc particulates.

FIG. 4 shows a plot of the decomposition rate of talc, chlorite and dolomite as a function of the $d_{95}$ value (by laser). It can be seen that the decomposition rates of talc and dolomite are correlated with the topcut, but the decomposition rate of chlorite is not. It can also be seen that the decomposition rate is faster for smaller talc particles (i.e. talc fractions having a lower topcut).

Example 12—Method for Determining Particle Size Distribution (by Sedigraph)

The Particle Size Distribution (PSD) was determined using a Sedigraph III from Micromeritics Instruments.

A dispersive solution was prepared by weighing out (using an analytical balance) and fully dissolving (by mechanical stirring) 250 mg of Calgon (sodium metaphosphate) in a beaker containing 1 litre of demineralised water. This step took from 45 to 60 minutes. 1 ml of Triton X (polyethylene glycol octyl phenyl ether) was then added to the solution while stirring for at least 10 minutes. Calgon and Trion X are wetting and dispersing agents.

A sample of talc particulate was prepared for sedigraphic analysis by combining 4.8 g of the talc particulate sample with 80 ml of the dispersive solution. Initially, the talc particulate was combined with a few drops of the 80 ml of dispersive solution in a beaker and the mixture was mixed using a manual stirrer until a paste consistency was achieved.

The remainder of the 80 ml of the dispersive solution was then added to the beaker. The beaker was placed in an ultrasonic bath for 30 seconds to remove air bubbles.

Sedigraphic analysis was then carried out on the dispersed sample using the Sedigraph III with the following settings:

Dispersive solution viscosity: 0.7523 mPa·s
Dispersive solution density: 0.9948 g/cm$^3$
Sample density: 2.78 g/cm$^3$ for talc powder
Diameter max: 52 μm
Diameter min.: 0.4 μm
Mode: high speed
Air bubbles detection: coarse A result was considered to be valid when the following criteria were met:

- the Reynolds number was below 0.3;
- the baseline (on the dispersive solution only) was between 125-130 kcounts/s;
- the full scale (on the sample suspension) was between 95-105 kcounts/s; and
- the difference between base/full scale was below 35 kcounts/s.

Example 13—Method for Determining Particle Size Distribution (by Laser Diffraction)

The Particle Size Distribution (PSD) was determined using a Mastersizer 2000 from Malvern instruments.

A sample of talc particulate was prepared for laser diffraction analysis. The required quantity of talc particulate was weighed in a 50 ml beaker. For a talc particulate having a $d_{50}$(by sedigraph) equal to or greater than 10 μm, a quantity of between 1 g and 2 g of the talc particulate was used. For a talc particulate having a $d_{50}$(by sedigraph) less than 10 μm, a quantity of between 0.2 g and 0.5 g of the talc particulate was used.

For coarse talc particulates (having a doo, by sedigraph, equal to or greater than 10 μm), the sample was combined with absolute ethanol (99.5%) wetting agent. In particular, the powder sample was distributed well at the bottom of the beaker. A few drops of ethanol was added to the powder and mixed using a manual stirrer until a paste consistency was achieved. Between 2 ml and 2.5 ml of ethanol was added to the beaker using a 3 ml disposable pipette and the suspension mixed with the manual stirrer. The beaker was placed in an ultrasonic bath for 30 seconds to remove air bubbles.

Laser diffraction analysis was then carried out on the sample using the Mastersizer 2000 with the following settings:

Sampler: Hydro 2000 G
Measurement theory: Mie 1.589-0.01 (i.e. the talc refractive index)
Water refraction index: 1.33
Measurement range: 0.02-2000 μm
Result calculation model: standard analysis
Number of snaps:
  Duration of measurement: 8 seconds
  Number of snaps per measurement: 8000 snaps
  Background noise time: 8000 snaps
  Background noise snaps: 8 seconds
Obscuration limits:
  Low: 5%
  High: 20%
Background noise alarm (value of background noise of detector n° 1): below 150 units
Measurement parameters of the sampler:
  Pump: 1800 rpm
  Stirring: 700 rpm
  Ultra-sonics: 100%

The analysis was carried out as follows:

First, it was checked that the obscuration lower limit was set to 5% and the obscuration upper limit was set to 20%. The stirrer speed was set to 700 rpm, the pump to 1800 rpm, and the Ultrasonics to 100%. The intensity of the laser was checked. If the intensity of the laser was below 77.5%, the following were checked: that the measurement cell was clean; that there were no air bubbles; and that there was no condensation on the measurement cell windows.

The background noise was measured and the intensity of the lasers (red and blue) was measured. Once the lasers were aligned, the intensity of the lasers and the intensity of the background noise (which must be in continuous decline from detector n° 1 to detector n° 51) was checked.

A 2 ml sample was taken from the beaker containing the talc particulate suspension using a disposable pipette and added, drop by drop, into the measurement cell until the required obscuration was obtained: for products with a $d_{50}$(by sedigraph) greater than or equal to 10 μm, measurement with an obscuration of between 15 and 20% was used; for products with a $d_{50}$(by sedigraph) below 10 μm, measurement an obscuration of between 5 and 12% was used. The suspension was homogenised in the cell for about 60 seconds.

The software directly traces the PSD curve expressed as a percentage of fines. The curve validity is controlled by the value of the weighted residual, the signal-to-noise ratio and the distribution of the luminous intensity of the background noise as a function of detectors. The result obtained is valid so long as the weighted residue is below 1.5% and there are no anomalies in the curve. The intensities of the measurement signal and the background noise on the detectors can be consulted using the data report tab. The intensity of the background noise must steadily decline from detector n° 1 to detector n° 51. The intensity of the measurement signal must be significantly greater than that of the background noise. The intensity of the background noise depends on how clean the cell is. The intensity of the signal depends mainly on the sample concentration (i.e. on the obscuration).

It has been found that a number of problems may arise, such as air bubbles or condensation in the measurement cell, if the pressure is too high or the water temperature is too cold. In order to avoid such problems, it is recommended to install a filtration system to improve water cleanliness and reduce its pressure, and to install a mixer tap to regulate the water temperature between 20 and 25° C. before the tank is supplied. It is also recommended that the optical bench (lasers) is never switched off

Example 14—Method for determining BET Specific Surface Area

The BET specific surface area was determined using a method based on the standard NF X 11-621 titled "Determination de l'aire massique (surface specifique) des poudres par adsorption de gaz—Méthode B.E.T.—Mesure volumétrique par adsorption d'azote à basse température" (Determination of mass area (specific surface) of powders by gas adsorption—BET Methods—Volumetric measurement by nitrogen adsorption at low temperature).

The method made use of a Micromeritics measurement apparatus (available from Micromeritics Instrument Corp., USA) including a vacuum pump, a VacPrep 061 degassing section, a Tristar 3000S measurement section and sample holders, a Mettler AG204 scale with a precision of 0.1 mg, Dewar flasks, nitrogen adsorbant gas and helium carrier gas.

The sample was weighed (to 0.1 mg accuracy) near the empty sample holder and its mass $M_0$ was recorded in g. The previously homogenised powder sample was then introduced, using a funnel, into the sample holder. Sufficient space (dead volume) was left between the sample and the top of the sample holder to enable free circulation of gas. The sample holder was placed into one of the degassing stations and degassed at 250° C. under a primary vacuum of 10 Pa for about 20 minutes. After degassing, a sufficient volume of nitrogen was added to the sample holder to avoid introducing air during transfer of the sample holder from the degassing station to the measurement station.

The sample holder was then attached to the measurement station and a Dewar flask containing liquid nitrogen was placed around the sample holder. The BET measurement was commenced using the device control software. The device then carried out the following operations automatically:

- Vacuum removal of the nitrogen introduced for the transfer of the sample holder;
- Leak test;
- Adding helium carrier gas;
- Measuring the dead volume at ambient temperature;
- Measuring the cold dead volume using liquid nitrogen;
- Helium vacuum removal;
- Leak test;
- Adding nitrogen at 950 mm Hg and measuring the saturation pressure; and
- Acquisition of analysis values.

The instrument's data acquisition and processing software plotted the transformed BET line from 5 measured adsorption points. The Dewar flask and then the sample holder were removed. The apparatus was allowed to return to ambient temperature and then the sample was again weighed (to an accuracy of 0.1 mg) near the sample holder and the weight was recorded as $M_2$ in g. The mass of the test portion of the sample, M, was calculated (in g) according to:

$$M = M_2 - M_0$$

The value M was then introduced into the software calculation program which automatically calculated the BET specific surface area of the sample in $m^2/g$.

Example 15—Method for Determining Oil Absorption

The oil absorption was determined by measuring the amount of oil necessary to wet the totality of a mass of the sample particulate (i.e. the amount of oil necessary to form a paste which does not crack or run off with the addition of water) according to ISO 787-5.

Figure 5:
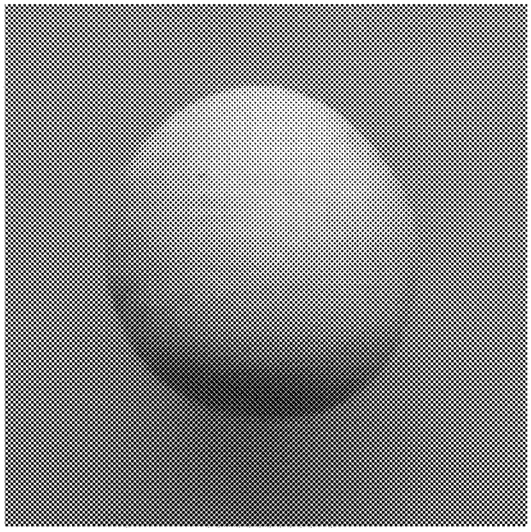
FIG. 5 shows photographs of a sample of a powder to which oil has been added to form a paste which (a) can be formed into a smooth ball, (b) forms a cracked ball or (c) forms a dripping ball.
Figure 5:
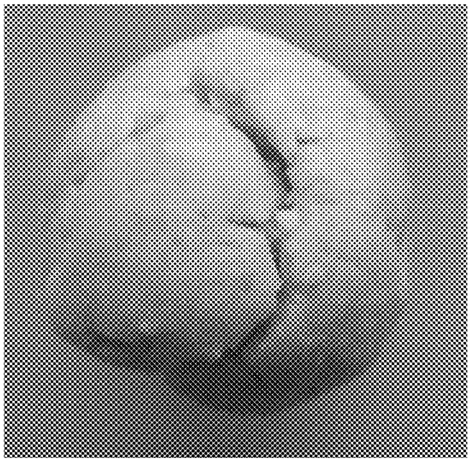
Figure 5:
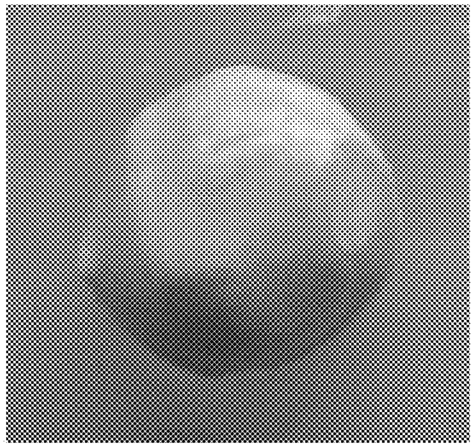

The equipment used included:

- Graduated burette
- Non-cutting glass plate
- 2 soft spatulas (length 155 mm×width 25 mm)
- 1 crystallizer
- Soapy water
- Balance accurate to 1 mg
- Linseed oil having a specific gravity of 0.93 g/mL Between 0.5 g to 5 g of the particulate (dependent on the density) was weighed out to produce a sample having a volume of about 10 mL. The mass of the sample was recorded as M. The sample was placed on the glass plate. The burette was filled with the linseed oil and the initial volume of oil in the burette was noted as $V_0$. Oil (typically between 3 and 4 drops) was gradually added to the sample using the burette and the sample was mixed using a spatula until a paste was formed. Oil was then added to the paste drop by drop, with the paste being kneaded between the addition of each drop, until a smooth, solid and non-dripping paste was formed. A smooth, solid and non-dripping paste was considered to be formed when the paste could be shaped into a ball without cracking or dripping with the addition of water. FIG. 5 (*a*) shows an example ball which can be shaped when a paste is smooth. FIG. 5 (*b*) shows a ball of paste which has cracked. FIG. 5 (*c*) shows a ball of paste which drips when water is added. When sufficient oil had been added to form a smooth, solid and non-dripping paste, the final volume of oil left in the burette was recorded as $V_1$.

The oil absorption was measured in mL/100 g as:

$$\text{Oil Absorption}(\text{mL}/100\text{ g}) = \frac{(V_1 - V_0)\times 100}{M}$$

or in wt. % as:

$$\text{Oil Absorption}(\text{wt. \%}) = \frac{(V_1 - V_0)\times 93}{M}$$

Example 16—Method for Determining Contact Angle

Water contact angle was measured using a FIBRO DAT 1100 Dynamic Absorption and Contact Angle Tester (available from FIBRO System, the Netherlands) kept in an air-conditioned room at 23° C. and 50% relative humidity. The talc sample was pressed into a compressed disc or tablet having a density of about 1.5 $g/cm^3$ and a thickness of about 2 mm using a hand-held press. Six of these thin discs/tablets were fitted into the relevant bar into the instrument and deionized water was added to the surface of each disc as 10 microliter droplets with a stroke pulse of 6 (this being a measure of the force at which the water droplet is expelled from the syringe tip of the FIBRO DAT 1100). The change in contact angle of the water droplets on the mineral surface was monitored with time and the results measured after 0.3 seconds (when the droplets were first stable on the pressed disc surfaces) were recorded. More hydrophobic surfaces give a higher water contact angle.

The foregoing broadly describes certain embodiments of the present invention without limitation. Variations and modifications as will be readily apparent to those skilled in the art are intended to be within the scope of the present invention as defined in and by the appended claims.

The invention claimed is:

1. A talc particulate having:

(A) a lamellarity index equal to or greater than about 2.8;

(B) a $d_{95sedi}$ equal to or greater than about 1.0 μm and less than about 5.0 μm;

(C) a $d_{95laser}$ equal to or greater than about 7.0 μm and equal to or less than about 20.0 μm; and (D) one or more of:

(a) a BET surface area equal to or greater than about 20 $m^2/g$ and equal to or less than about 30 $m^2/g$;

(b) a $d_{50sedi}$ equal to or greater $_{than}$ about 0.5 μm and equal to or less than about 2.5 μm; and (c) a $d_{50laser}$ equal to or greater than about 2.0 μm and equal to or less than about 8.0 μm.

2. A talc particulate having a contact angle equal to or less than about 43°, a $d_{95laser}$ equal to or greater than about 7.0 μm and equal to or less than about 23.0 μm, and one or more of the following:

(a) a $d_{95sedi}$ equal to or less than about 6.5 μm;

(b) a delamination index according to TOT layers (DI (TOT)) equal to or greater than about 103; and (c) an oil absorption equal to or greater than about 65 mL/100 g.

3. The talc particulate of claim 1, having one or more of the following:

(a) a coherent scattering domain (CSD c*) equal to or less than about 1150 Angstroms and equal to or greater than about 750 Angstroms;

(b) equal to or less than about 120 tetrahedral-octahedral-tetrahedral (TOT) layers and equal to or greater than about 50 TOT layers; and (c) a delamination index according to TOT layers (DI (TOT)) equal to or greater than about 103 and equal to or less than about 200.

4. The talc particulate of claim 1, having one or more of the following:

(a) a shape factor equal to or greater than about 70 and equal to or less than about 200; and a lamellarity index equal to or greater than about 2.8 and equal to or less (b) than about 6.0.

5. The talc particulate of claim 1, having an oil absorption equal to or greater than about 65 mL/100g and equal to or less than about 100 mL/100 g.

6. The talc particulate of claim 1, having a contact angle equal to or less than about 43° and/or equal to or greater than about 33°.

7. A polymer composition comprising a talc particulate of claim 1.

8. The talc particulate of claim 2, having:

(a) a shape factor equal to or greater than about 70 and equal to or less than about 200; and (b) a lamellarity index equal to or greater than about 2.8 and equal to or less than about 6.0.

9. The talc particulate of claim 8, having a coherent scattering domain (CSD c*) equal to or greater than about 750 Angstroms and equal to or less than about 1150 Angstroms.

10. The talc particulate of claim 9, having equal to or greater than about 50 tetrahedral-octahedral-tetrahedral (TOT) layers and equal to or less than about 120 TOT layers.

11. The talc particulate of claim 2 having:

(A) a delamination index according to TOT layers (DI (TOT)) equal to or greater than about 103;

(B) an oil absorption equal to or greater than about 65 mL/100 g; and (C) a $d_{95sedi}$ equal to or less than about 6.5 μm.

12. The talc particulate of claim 11, having:

(a) a shape factor equal to or greater than about 70 and equal to or less than about 200; and (b) a lamellarity index equal to or greater than about 2.8 and equal to or less than about 6.0.

13. The talc particulate of claim 12, having a coherent scattering domain (CSD c*) equal to or greater than about 750 Angstroms and equal to or less than about 1150 Angstroms.

14. The talc particulate of claim 13, having equal to or greater than about 50 tetrahedral-octahedral-tetrahedral (TOT) layers and equal to or less than about 120 TOT layers.

15. The talc particulate of claim 4, having an oil absorption equal to or greater than about 65 mL/100 g and equal to or less than about 100 mL/100 g.

16. The talc particulate of claim 1, having (a) a BET surface area equal to or greater than about 20 $m^2/g$ and equal to or less than about 30 $m^2/g$; and (b) a lamellarity index equal to or greater than about 2.8 and equal to or less than about 6.0.

17. The talc particulate of claim 16, having an oil absorption equal to or greater than about 65 mL/100 g and equal to or less than about 100 mL/100 g.

18. The talc particulate of claim 16, having a contact angle equal to or less than about 43° and/or equal to or greater than about 33°.

* * * * *